United States Patent
Murakami et al.

(10) Patent No.: US 10,491,059 B2
(45) Date of Patent: Nov. 26, 2019

(54) ROTATING ELECTRIC MACHINE INCLUDING SWAGING PORTIONS FOR STEEL SHEETS OF STATOR CORE

(71) Applicant: Mitsubishi Electric Corporation, Tokyo (JP)

(72) Inventors: Tadashi Murakami, Tokyo (JP); Naomi Kikuchi, Tokyo (JP); Atsushi Sakaue, Tokyo (JP); Tatsuro Hino, Tokyo (JP); Akihiro Yamamura, Tokyo (JP); Shogo Okamoto, Tokyo (JP); Shinji Nishimura, Tokyo (JP); Masaya Inoue, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 130 days.

(21) Appl. No.: 15/507,992

(22) PCT Filed: Jan. 15, 2015

(86) PCT No.: PCT/JP2015/050920

§ 371 (c)(1),
(2) Date: Mar. 1, 2017

(87) PCT Pub. No.: WO2016/113876

PCT Pub. Date: Jul. 21, 2016

(65) Prior Publication Data

US 2017/0288480 A1    Oct. 5, 2017

(51) Int. Cl.
*H02K 1/18* (2006.01)
*H02K 1/14* (2006.01)
(Continued)

(52) U.S. Cl.
CPC ............. *H02K 1/185* (2013.01); *H02K 1/148* (2013.01); *H02K 1/276* (2013.01); *H02K 5/1732* (2013.01)

(58) Field of Classification Search
CPC .......... H02K 1/148; H02K 1/185; H02K 1/27; H02K 1/276; H02K 5/1732
(Continued)

(56) References Cited

U.S. PATENT DOCUMENTS 6,163,949 A * 12/2000 Neuenschwander .. B21D 28/02
29/521
8,581,468 B2 * 11/2013 Kudose ................... H02K 1/16
310/156.78

(Continued)

FOREIGN PATENT DOCUMENTS

| JP | 2003-264962 A | 9/2003 |
| JP | 2003-274582 A | 9/2003 |

(Continued)

OTHER PUBLICATIONS

Communication dated Oct. 3, 2017, from Japanese Patent Office in counterpart application No. 2016-569173.
(Continued)

*Primary Examiner* — Mang Tin Bik Lian
*Assistant Examiner* — Rashad H Johnson
(74) *Attorney, Agent, or Firm* — Sughrue Mion, PLLC; Richard C. Turner

(57) ABSTRACT

While lamination of steel sheets to be included in a stator core having a plurality of tooth portions is performed through swaging at yoke portions and through swaging at tooth portions, the stator core is formed in such a way as to include the tooth portion having a portion that is pressed into another steel sheet through swaging and the tooth portion having no portion that is pressed into another steel sheet through swaging.

7 Claims, 29 Drawing Sheets

(51) Int. Cl.
*H02K 1/27* (2006.01)
*H02K 5/173* (2006.01)

(58) Field of Classification Search
USPC .................................................. 310/216.048
See application file for complete search history.

(56) References Cited

U.S. PATENT DOCUMENTS

| | | | | |
|---|---|---|---|---|
| 2009/0195110 A1* | 8/2009 | Miyake | .................... | H02K 1/08 310/216.058 |
| 2011/0148246 A1* | 6/2011 | Mizutani | .................. | H02K 1/16 310/216.009 |
| 2013/0320801 A1* | 12/2013 | Takasaki | .................. | H02K 1/16 310/216.009 |
| 2014/0368080 A1 | 12/2014 | Miyajima et al. | | |

FOREIGN PATENT DOCUMENTS

| | | | |
|---|---|---|---|
| JP | 2006-174631 A | 6/2006 |
| JP | 2008-252978 A | 10/2008 |
| JP | 2011-120392 A | 6/2011 |
| JP | 2013-059262 A | 3/2013 |
| JP | 2015-002617 A | 1/2015 |

OTHER PUBLICATIONS

International Search Report for PCT/JP2015/050920 dated Mar. 31, 2015.
Communication dated Sep. 17, 2018 from the State Intellectual Property Office of the P.R.C. in counterpart Application No. 201580072971.

* cited by examiner

ROTATING ELECTRIC MACHINE INCLUDING SWAGING PORTIONS FOR STEEL SHEETS OF STATOR CORE

CROSS REFERENCE TO RELATED APPLICATIONS

This application is a National Stage of International Application No. PCT/JP2015/050920 filed Jan. 15, 2015, the contents of all of which are incorporated herein by reference in their entirety.

TECHNICAL FIELD

The present invention relates to a rotating electric machine provided with a stator core formed of a steel-sheet laminate in which two or more electromagnetic steel sheets are stacked.

BACKGROUND ART

It is known that in a conventional rotating electric machine, the stator core is formed of a steel-sheet laminate in which two or more electromagnetic steel sheets are stacked. For example, as disclosed in Japanese Patent Application Laid-Open No. 2008-252978 (Patent Document 1) or Japanese Patent Application Laid-Open No. 2013-59262 (Patent Document 2), with regard to the stator core of a rotating electric machine, a method of utilizing swaging for uniting stacked steel sheets is known. Moreover, for example, as disclosed in Japanese Patent Application Laid-Open No. 2003-264962 (Patent Document 3), a method of uniting stacked steel sheets through bonding is known.

[Patent Document 1] Japanese Patent Application Laid-Open No. 2008-252978
[Patent Document 2] Japanese Patent Application Laid-Open No. 2013-59262
[Patent Document 3] Japanese Patent Application Laid-Open No. 2003-264962

DISCLOSURE OF THE INVENTION

Problems to be Solved by the Invention

As disclosed in Patent Document 1 or Patent Document 2, when in a conventional rotating electric machine, lamination of thin steel sheets of a stator core is performed through swaging at the yoke portion and swaging at the tooth portion, the swaging portions penetrate the laminate in the thickness direction and hence an eddy current penetrates the laminate in the thickness direction; therefore, there has been a problem that when magnetic flux generated by the rotor passes across the penetrated swaging portions, large eddy current loss is caused and hence the efficiency is deteriorated. The configuration disclosed in Patent Document 2 reduces the number of swaging portions at the tooth portions, so that it is made possible to diminish the eddy-current conduction circuit formed in the laminated core, while performing lamination through swaging. However, because part of the stacked steel sheets are not provided with any tooth portion, there has been a problem that the lamination strength of the tooth portion at that part is reduced.

In contrast, in the case where as disclosed in Patent Document 3, steel sheets are stacked through bonding, it is difficult to maintain the positional relationship, at a time of lamination, between the steel sheets; thus, there has been a problem that in comparison with the case where lamination is made through swaging, the dimensional accuracy of the product is decreased.

The present invention has been implemented in order to solve the foregoing problems; the objective thereof is to provide a high-electromagnetic-efficiency rotating electric machine in which the loss in the stator core laminated through swaging is reduced and the lamination strength is secured.

Means for Solving the Problems

A rotating electric machine according to the present invention has a rotor pivotably provided and a stator disposed at the outer circumference side of the rotor; the stator has an annular stator core and a coil portion wound around the stator core; the stator core includes two or more divided cores arranged in an annular manner; the divided core has a laminated structure in which steel sheets that each have a yoke portion formed in the circumferential direction and two tooth portions formed in such a way as to protrude from the yoke portion toward the radial-direction inner side are united with one another by respective first swaging portions provided in the yoke portions and respective second swaging portions provided in the tooth portions; the divided core has at least one portion where steel sheets that are adjacent to each other in the thickness direction are not united by the second swaging portion at one of or both of the two tooth portions.

Advantage of the Invention

In a rotating electric machine according to the present invention, lamination of the stator core is performed through swaging at yoke portions and tooth portions, so that the strength of the lamination is maintained, and there is provided a portion where steel sheets are not united with each other through swaging at the tooth portion, so that the eddy-current conduction circuit can be diminished; thus, the loss in the rotating electric machine can be reduced.

The foregoing and other objects, features, aspects and advantages of the present invention will become more apparent from the following detailed description of the present invention when taken in conjunction with the accompanying drawings.

BEST MODE FOR CARRYING OUT THE INVENTION

Figure 1:
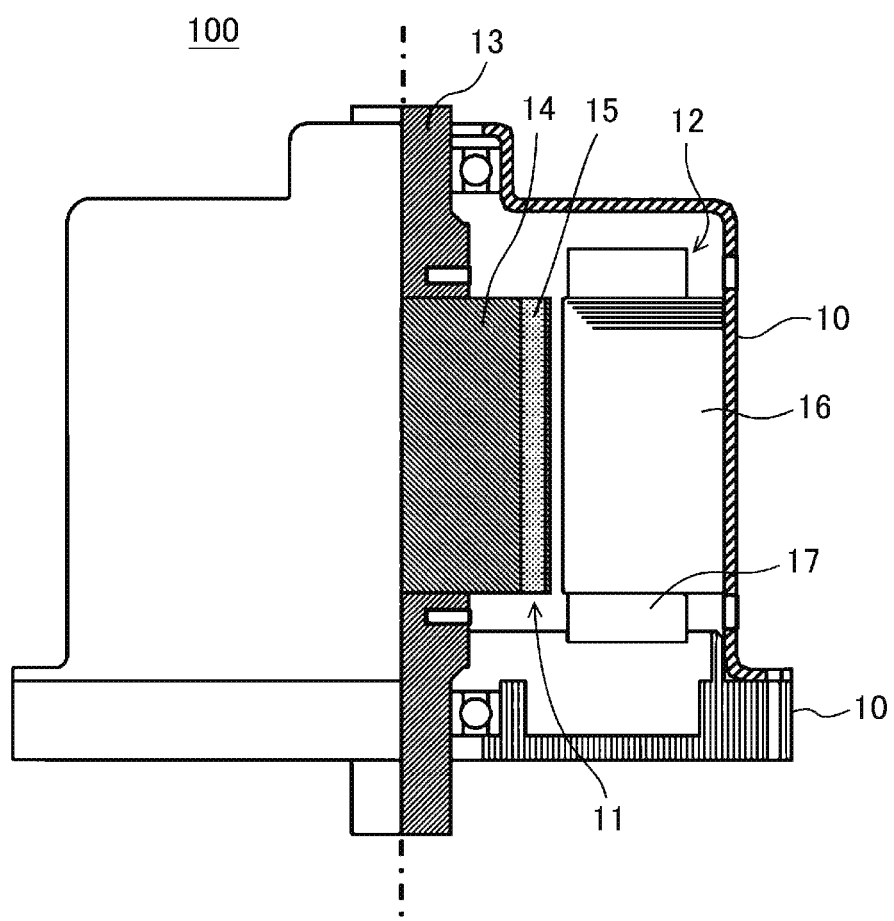
FIG. 1 is a side cross-sectional view of a rotating electric machine according to Embodiment 1 of the present invention.

Hereinafter, preferred embodiments of a rotating electric machine according to the present invention will be explained with reference to the drawings. The explanation will be made with reference to the drawings, in each of which the same or similar constituent elements are designated by the same reference numerals.

Embodiment 1

FIG. 1 is a side cross-sectional view of a rotating electric machine according to Embodiment 1 of the present invention.

Figure 2:
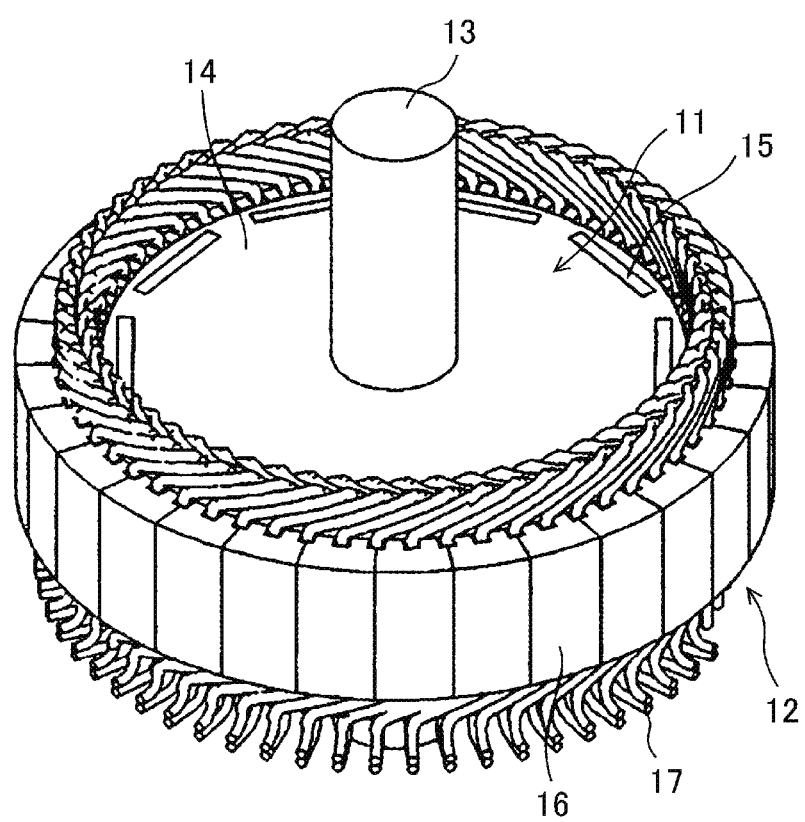
FIG. 2 is a perspective view illustrating the appearances of the stator and the rotor of the rotating electric machine according to Embodiment 1 of the present invention.

In FIG. 1, a rotating electric machine 100 is provided with a rotor 11 pivotably mounted in a case 10 and a stator 12 fixed to the case 10; the outer circumference of the rotor 11 faces the inner circumference of the stator 12 through a predetermined gap. As illustrated in FIG. 2, the rotor 11 has a shaft 13, a rotor core 14 fixed to the shaft 13, and magnets 15 fixed in the rotor core 14.

Figure 3:
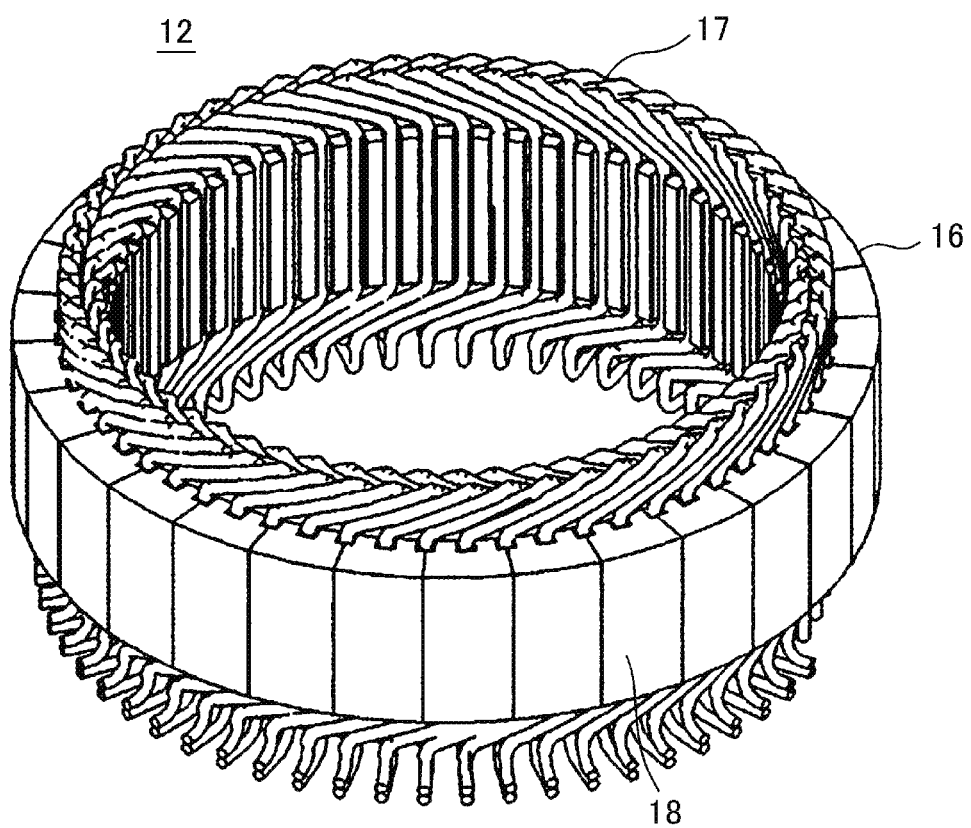
FIG. 3 is a perspective view illustrating the appearance of the stator of the rotating electric machine according to Embodiment 1 of the present invention.
Figure 4:
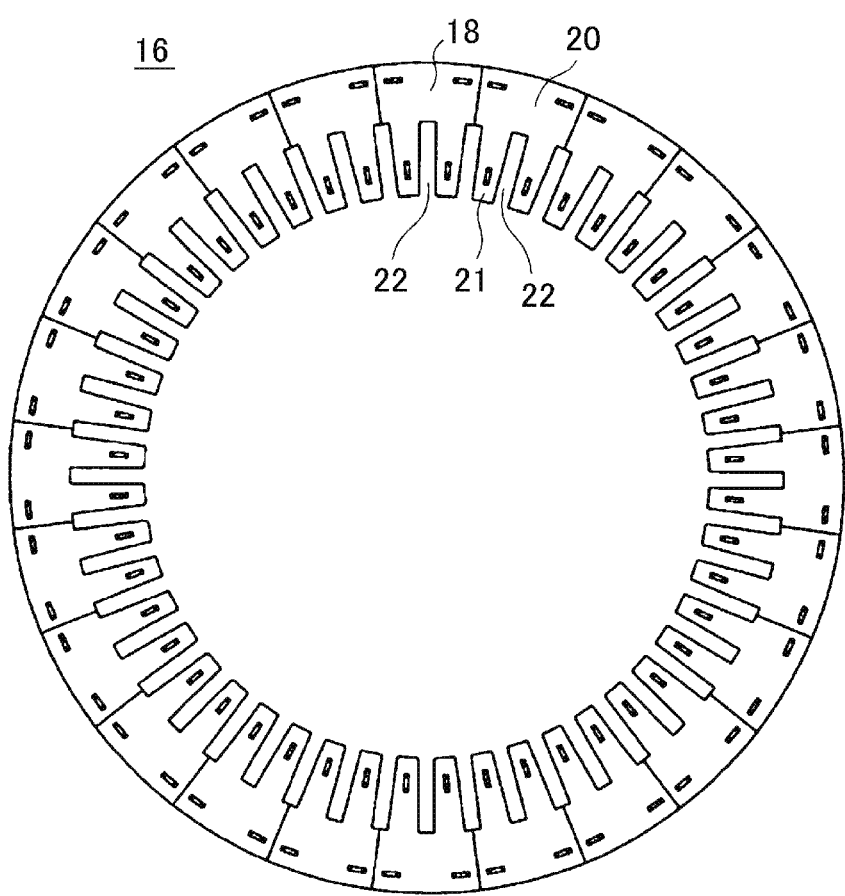
FIG. 4 is a front view of the stator core in the rotating electric machine according to Embodiment 1 of the present invention.
Figure 5:
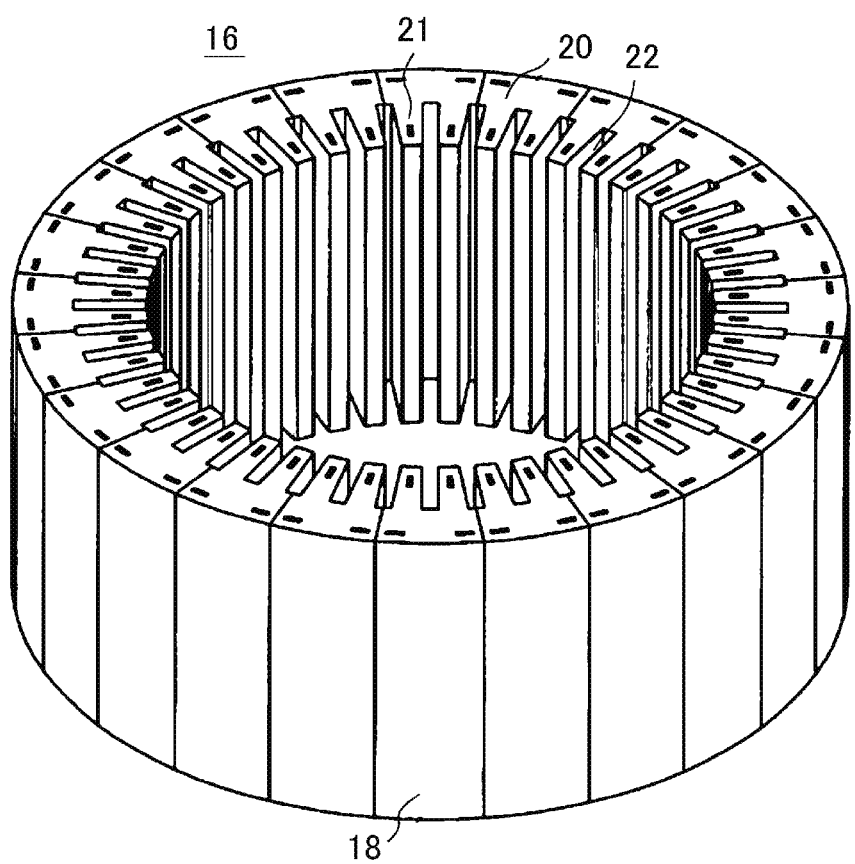
FIG. 5 is a perspective view of the stator core in the rotating electric machine according to Embodiment 1 of the present invention.
Figure 6:
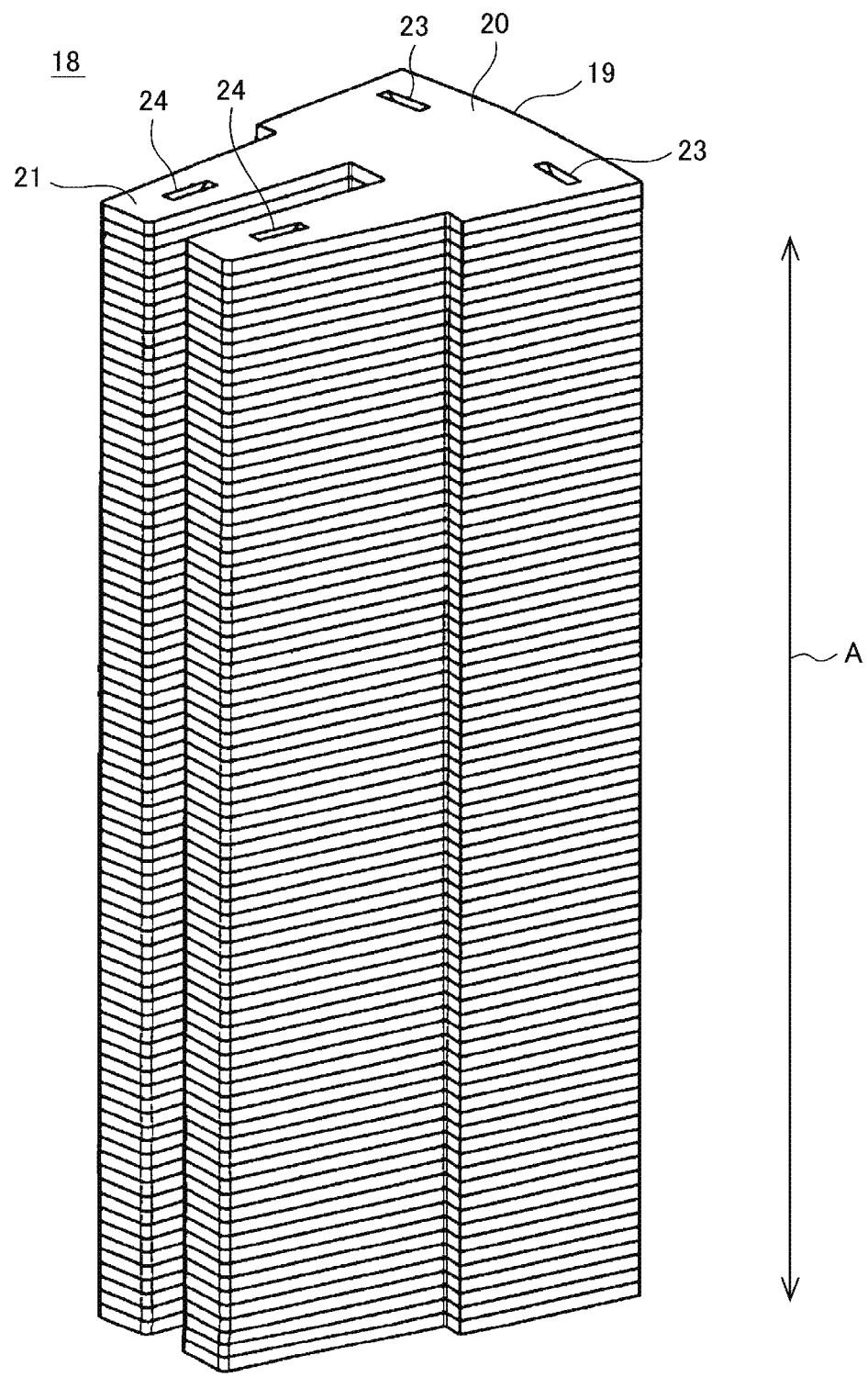
FIG. 6 is a perspective view of one of the divided cores in the stator of the rotating electric machine according to Embodiment 1 of the present invention.
Figure 7:
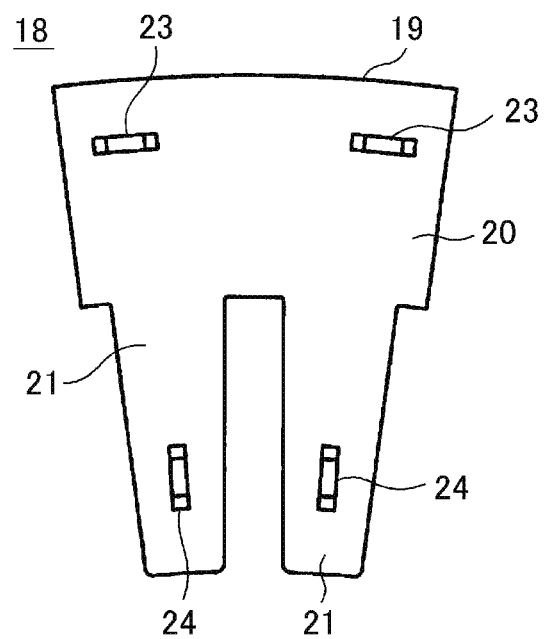
FIG. 7 is a front view of one of the divided cores in the stator of the rotating electric machine according to Embodiment 1 of the present invention.

As illustrated in FIG. 3, the stator 12 has an annular stator core 16 and a coil 17 wound around the stator core 16 in a distributed manner. As illustrated in FIGS. 4 and 5, the stator core 16 is configured with divided cores 18 arranged in an annular manner. As illustrated in FIG. 6, the divided core 18 includes two or more stacked steel sheets 19; as illustrated in FIG. 7, each of the steel sheets 19 is provided with a yoke portion 20 extending in the circumferential direction and two tooth portions 21 that each extend from the yoke portion 20 toward the radial-direction inner side. The stator core 16 includes slot portions 22, each of which is adjacent to the tooth portion 21. As illustrated in FIG. 6, the lamination-thickness direction A of the steel sheets 19 included in the divided core 18 is equal to the axis direction of the stator core 16. The steel sheets 19 are stacked in such a way as to be united with one another by respective first swaging portions 23 provided in the yoke portion 20 and respective second swaging portions 24 provided in the tooth portions 21.

Figure 9A:
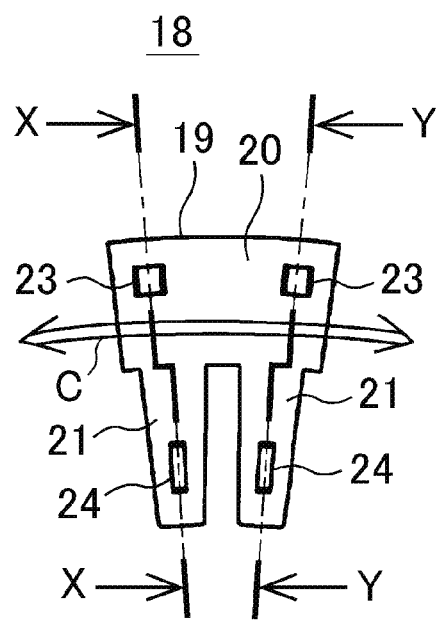
FIG. 9A is a view illustrating the image of magnetic flux along the yoke portion of the divided core in each of FIGS. 8A, 8B, and 8C.
Figure 9B:
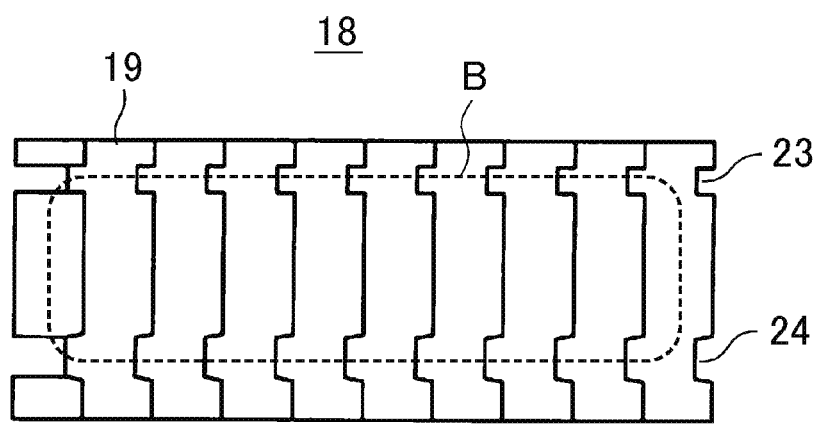
FIG. 9B is a view illustrating the image of an eddy current generated in the divided core in each of FIGS. 8A, 8B, and 8C.
Figure 9C:
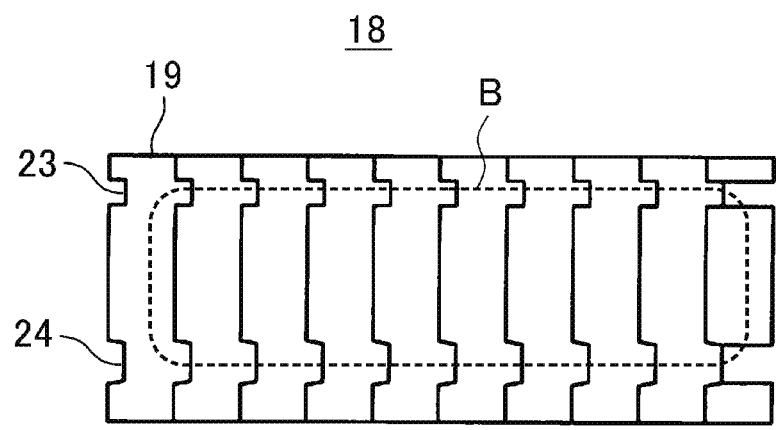
FIG. 9C is a view illustrating the image of an eddy current generated in the divided core in each of FIGS. 8A, 8B, and 8C.
Figure 10:
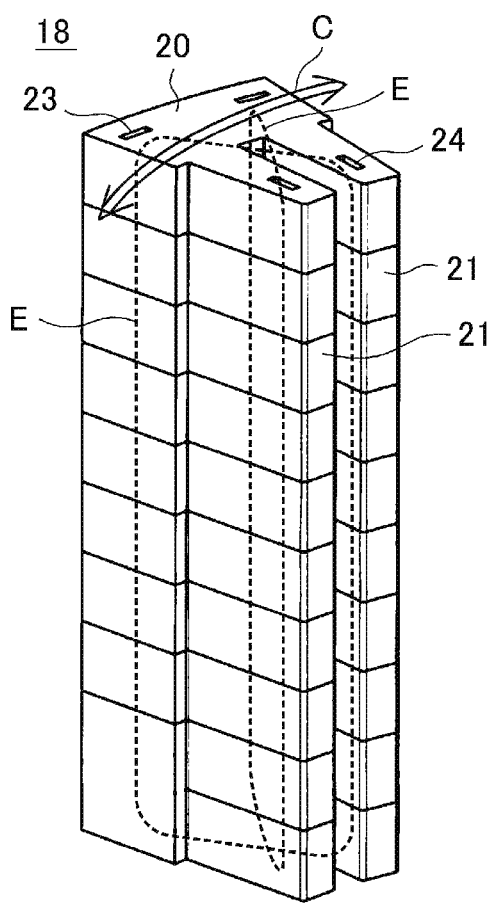
FIG. 10 is a view illustrating the images of magnetic flux and an eddy current generated in the divided core in each of FIGS. 8A, 8B, and 8C.

Meanwhile, in the case of the swaging method for the stator cores, disclosed in Patent Document 1, the first swaging portions 23 circumferentially provided in the yoke portions 20 and the second swaging portions 24 provided in the tooth portions 21 extending from the yoke portion 20 toward the radial-direction inner side each penetrate the steel sheets 19 in the lamination-thickness direction A; as illustrated in FIGS. 9B, 9C, and 10, the penetrating first swaging portions 23 and second swaging portions 24 form eddy-current conduction circuits B and E through the steel sheets 19; thus, there has been a problem that, for example, when as illustrated in FIG. 9A, magnetic flux C lying along the yoke portion 20 passes through the divided core 18, large eddy current loss is caused.

Figure 8A:
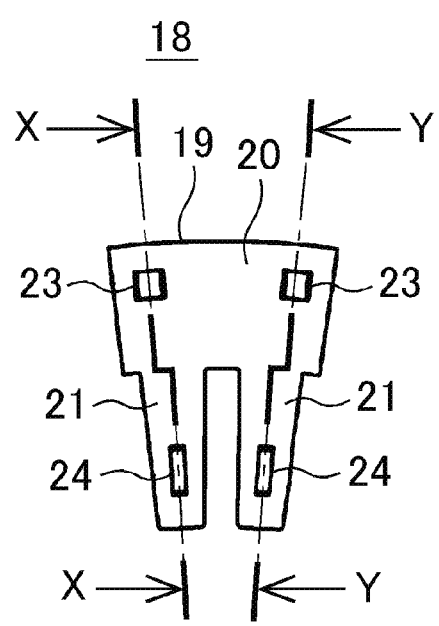
FIG. 8A is a view of a divided core in the stator of a conventional rotating electric machine, when viewed in the laminating direction.
Figure 8B:
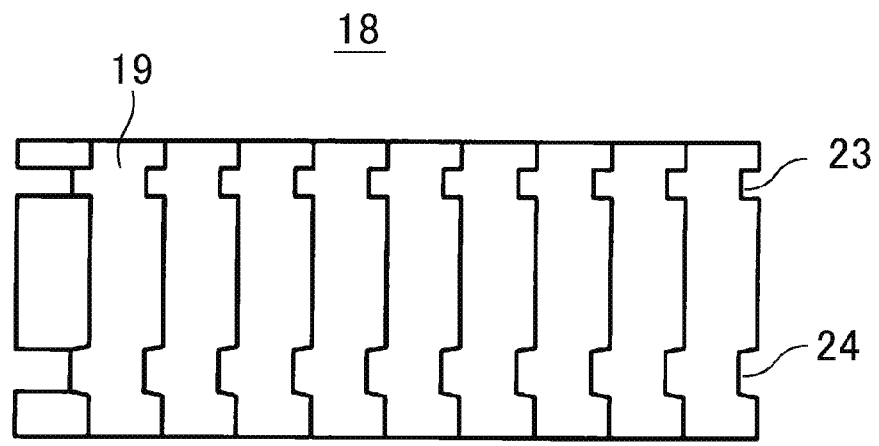
FIG. 8B is a cross-sectional view of the divided core in FIG. 8A, taken along the line X-X.
Figure 8C:
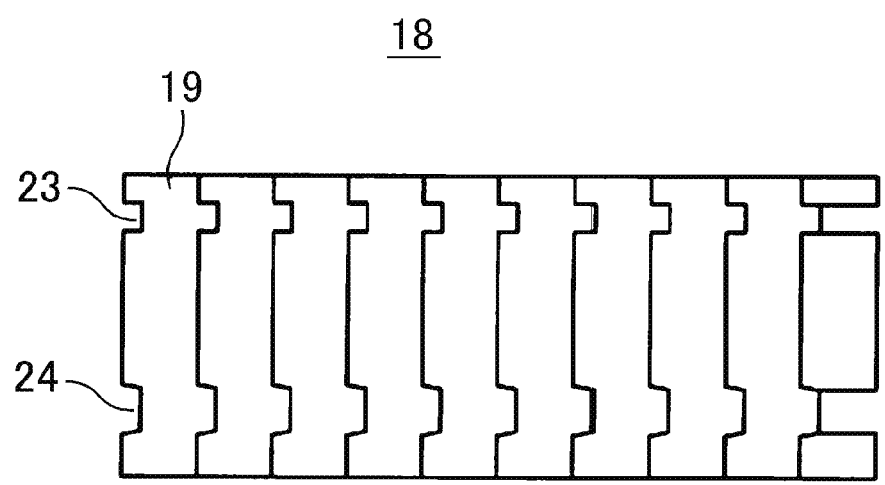
FIG. 8C is a cross-sectional view of the divided core in FIG. 8A, taken along the line Y-Y.

When large eddy current loss is caused, the temperature rise in the stator 12 becomes large and hence the magnet 15 provided in the rotor 11 becomes liable to be demagnetized. Accordingly, it is required to reduce the current density in the coil 17 in order to suppress the temperature rise; thus, there has been a problem, for example, that it is compelled to degrade the performance of the rotating electric machine 100. Moreover, because at each of the first swaging portion 23 and the second swaging portion 24, a protrusion portion of the steel sheet 19 is inserted into the corresponding recess portion thereof, the stress is caused. Because there exists a problem that when the stress is caused, the magnetic permeability of the steel sheet 19 is degraded and hence the efficiency of the rotating electric machine 100 is deteriorated, it is preferable that the number of press fitting portions is small. FIG. 8A is a view of the divided core 18, when viewed in the laminating direction; FIG. 8B is a cross-sectional view of the divided core in FIG. 8A, taken along the line X-X; FIG. 8C is a cross-sectional view of the divided core in FIG. 8A, taken along the line Y-Y. FIG. 9A is a view illustrating the image of magnetic flux lying along the yoke portion 20; each of FIGS. 9B and 9C is a view illustrating the image of an eddy current generated in the divided core 18 in each of FIGS. 8A, 8B, and 8C. FIG. 10 is a view illustrating the images of magnetic flux and an eddy current generated in the divided core in each of FIGS. 8A, 8B, and 8C.

In order to cope with these problems, a configuration is conceivable in which as disclosed in Patent Document 2, the steel sheet 19 in which the second swaging portion 24 is provided in the tooth portion 21 thereof and the steel sheet 19 in which the second swaging portion 24 is not provided in the tooth portion 21 thereof are alternately stacked; however, because the steel sheet 19 in which the second swaging portion 24 is not provided in the tooth portion 21 thereof is not united with the steel sheet 19 in which the second swaging portion 24 is provided in the tooth portion 21 thereof, the lamination strength is degraded at that point.

In the case where when the stator core 16 is configured with two or more divided cores 18, the stator core 16 is pressed or shrinkage-fitted into the case 10 so as to be fixed to the case 10 by use of the circumferential-direction residual stress, there is posed a problem that the tooth portion 21 warps, when the lamination strength of the tooth portion 21 is insufficient. When in the case of a distributed-winding motor, a warp is caused in the tooth portion 21, there is posed a problem that when the coil 17 is inserted into the slot portion 22 formed adjacent to the tooth portion 21, the coating of the coil 17 is damaged. In the case where a high insulating performance is required, measures such as making the coating thicker, inserting an insulator between the stator core 16 and the coil 17, and the like are required, thereby decreasing the space factor of the electric conductor; as a result, the performance of the rotating electric machine 100 is degraded. Therefore, it is important to secure the dimensional accuracy of the tooth portion 21.

Figure 11A:
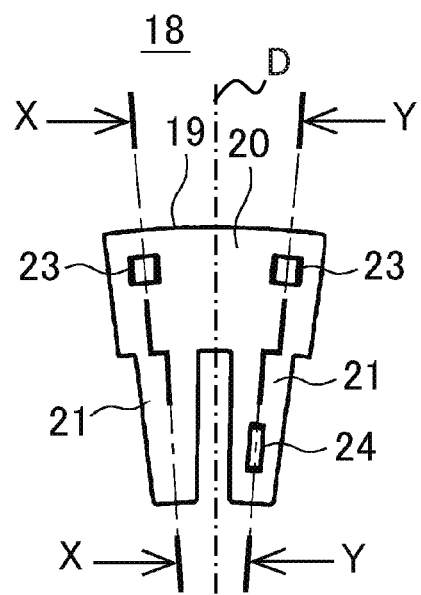
FIG. 11A is a view of a divided core in the stator of the rotating electric machine according to Embodiment 1 of the present invention, when viewed in the laminating direction.
Figure 11B:
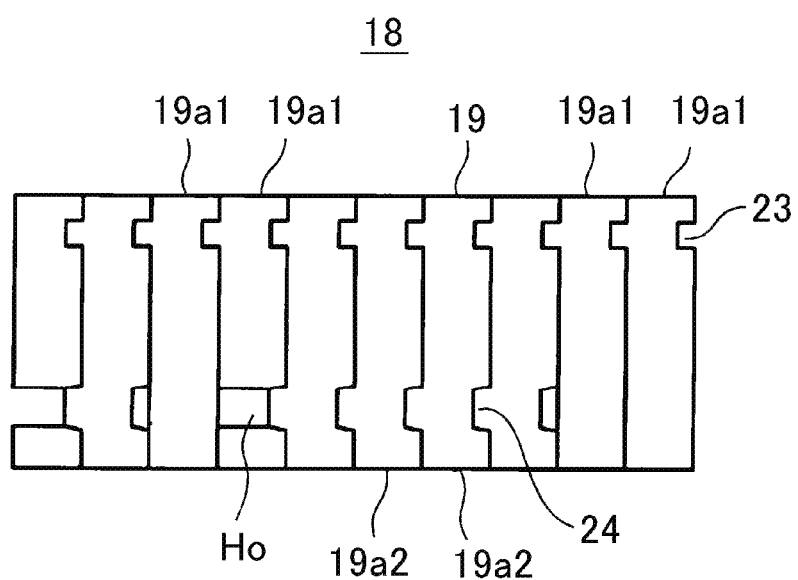
FIG. 11B is a cross-sectional view of the divided core in FIG. 11A, taken along the line X-X.
Figure 11C:
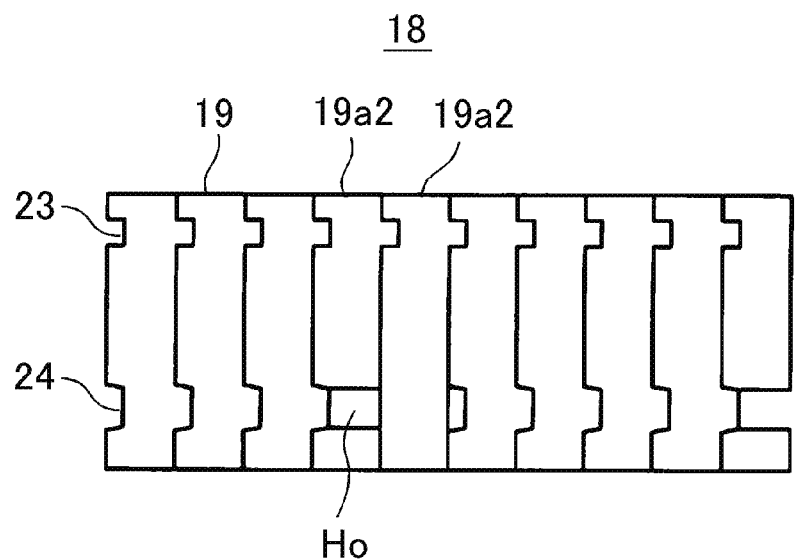
FIG. 11C is a cross-sectional view of the divided core in FIG. 11A, taken along the line Y-Y.
Figure 12A:
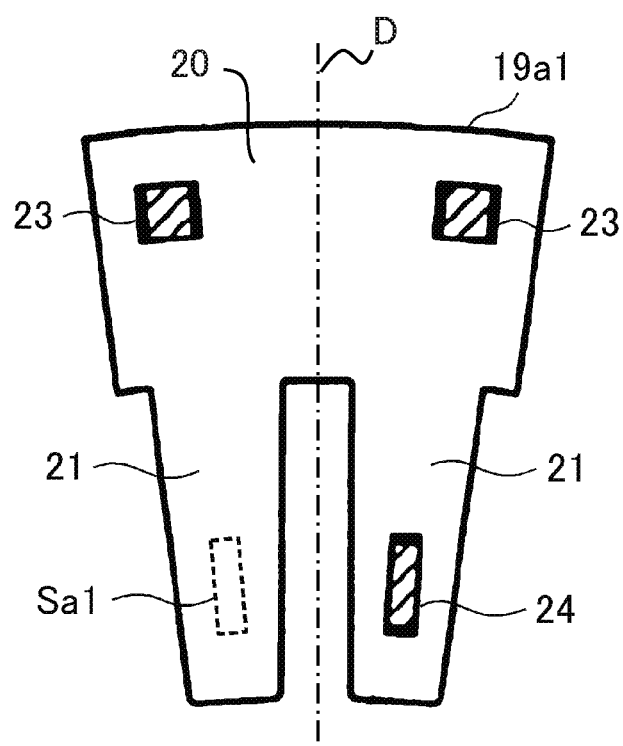
FIG. 12A is a front view of one of the steel sheets included in the divided core of the rotating electric machine according to Embodiment 1 of the present invention.
Figure 12B:
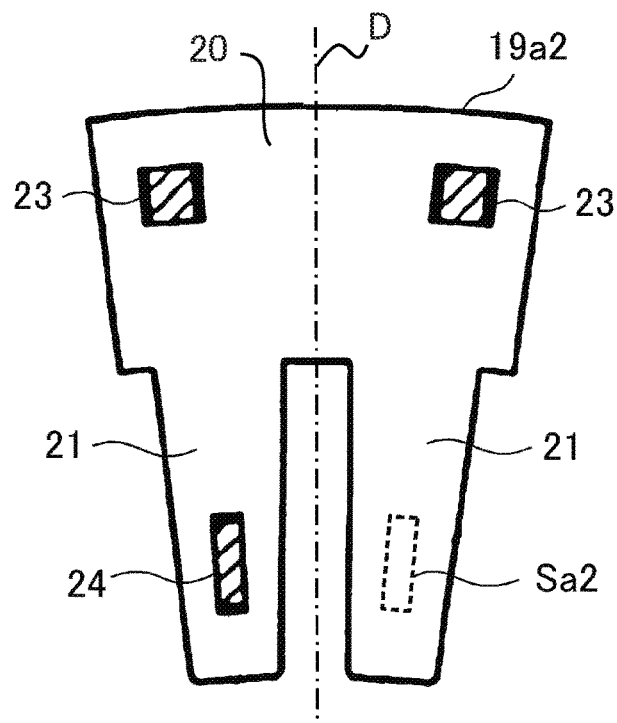
FIG. 12B is a front view of one of the steel sheets included in the divided core of the rotating electric machine according to Embodiment 1 of the present invention.
Figure 13A:
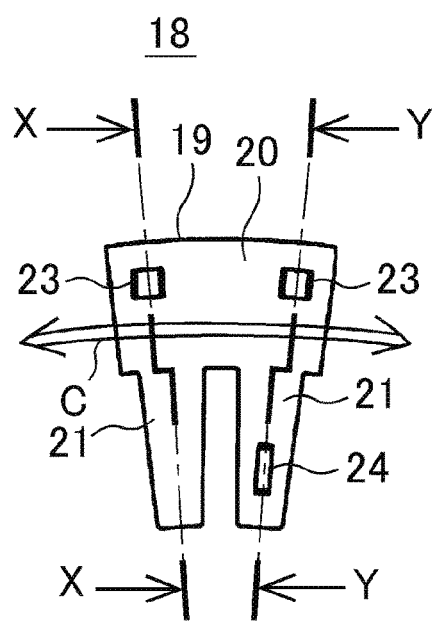
FIG. 13A is a view illustrating the image of magnetic flux along the yoke portion of the divided core in each of FIGS. 11A, 11B, and 11C.
Figure 13B:
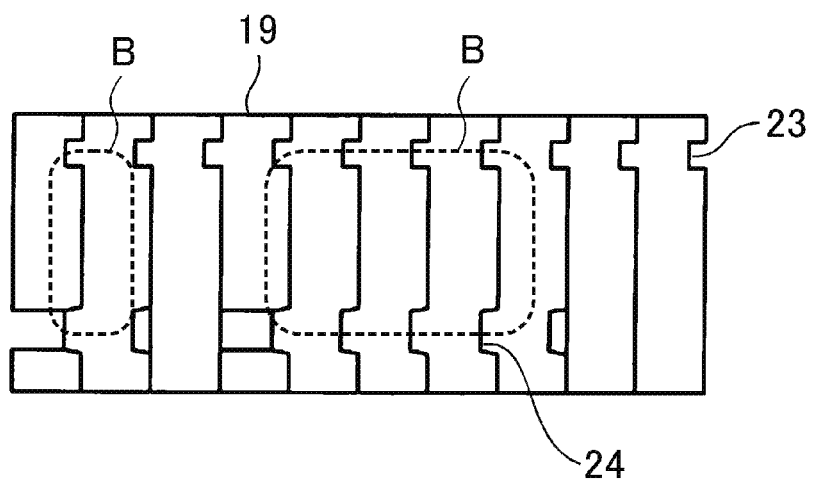
FIG. 13B is a view illustrating the image of an eddy current generated in the divided core in each of FIGS. 11A, 11B, and 11C.
Figure 13C:
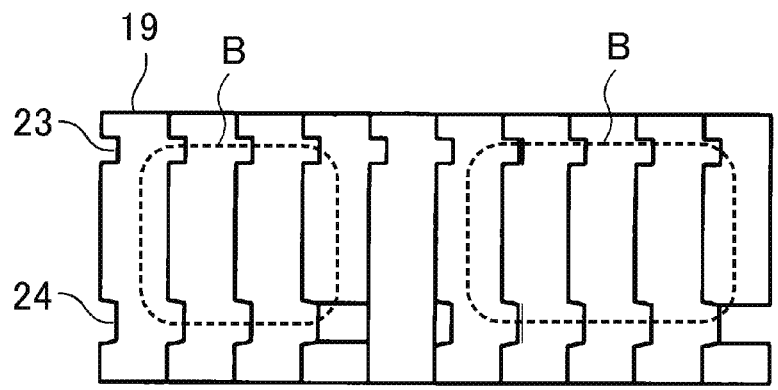
FIG. 13C is a view illustrating the image of an eddy current generated in the divided core in each of FIGS. 11A, 11B, and 11C.

In order to cope with the foregoing problems, with regard to the second swaging portions 24 to be provided in the two tooth portions 21 of the steel sheet 19, the divided core 18, illustrated in each of FIGS. 11A, 11B, and 11C, of the rotating electric machine 100 according to Embodiment 1 includes steel sheets 19a1 and 19a2 in each of which the second swaging portion 24 to be pressed into another steel sheet 19 through swaging is provided in one of the two tooth portions and the second swaging portion 24 to be pressed into another steel sheet 19 through swaging is not provided in the other one of the two tooth portions, as illustrated in FIGS. 12A and 12B. At portions Sa1 and Sa2 in each of which the steel sheets adjacent to each other in the thickness direction are not united with each other by the second swaging portion 24, the eddy-current conduction circuit between the steel sheets 19 is disconnected. As a result, as illustrated in each of FIGS. 13B and 13C, the loop of the eddy-current conduction circuit becomes small; thus, for example, when as illustrated in FIG. 13A, magnetic flux lying along the yoke portion 20 passes through the divided core 18, the eddy current loss can be suppressed in comparison with the case where the eddy-current conduction circuit B illustrated in FIG. 9B is formed. In each of FIGS. 11B and 11C, the Reference Character Ho denotes a through-hole formed in the steel sheet 19. FIG. 11A is a view of the divided core 18, when viewed in the laminating direction; FIG. 11B is a cross-sectional view of the divided core in FIG. 11A, taken along the line X-X; FIG. 11C is a cross-sectional view of the divided core in FIG. 11A, taken along the line Y-Y. FIG. 13A is a view illustrating the image of magnetic flux lying along the yoke portion 20; each of FIGS. 13B and 13C is a view illustrating the image of an eddy current generated in the divided core 18 in each of FIGS. 11A, 11B, and 11C.

In the case of the configuration of the swaging portions in the steel sheet 19 illustrated in each of FIGS. 11A, 11B, and 11C, even when some of two or more second swaging portions 24 provided in the steel sheets 19 are not united with the tooth portions 21 of the other steel sheets 19, at least one of other second swaging portions 24 is united with the tooth portion 21 of another steel sheet 19; therefore, it is made possible to maintain the lamination strength in the tooth portion 21, while reducing the number of the second swaging portions 24. Accordingly, the tooth portion 21 can be prevented from warping. By preventing a warp in the tooth portion 21, the dimensional accuracy of the divided core 18 can be secured; thus, there is also demonstrated an effect that the gap between the stator 12 and the rotor 11 can be secured.

Because the steel sheets 19 are united by the first swaging portion 23 and the second swaging portion 24, the production is easy in comparison with the case where the steel sheets 19 are stacked through bonding; moreover, when the steel sheets 19 are stacked, the accuracy of the positional relationship between the steel sheets 19 is satisfactory.

Embodiment 2

Next, a rotating electric machine according to Embodiment 2 of the present invention will be explained.

Figure 14A:
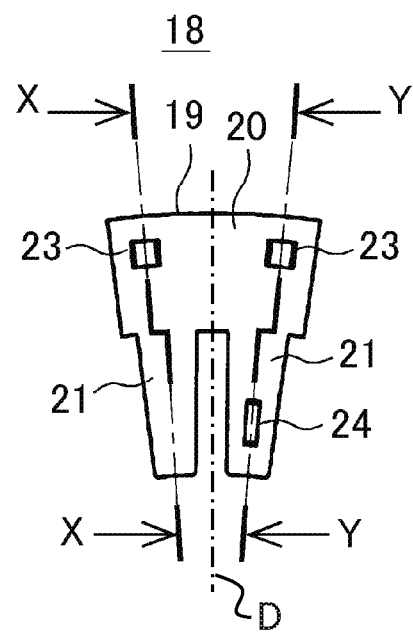
FIG. 14A is a view of a divided core in the stator of a rotating electric machine according to Embodiment 2 of the present invention, when viewed in the laminating direction.
Figure 14B:
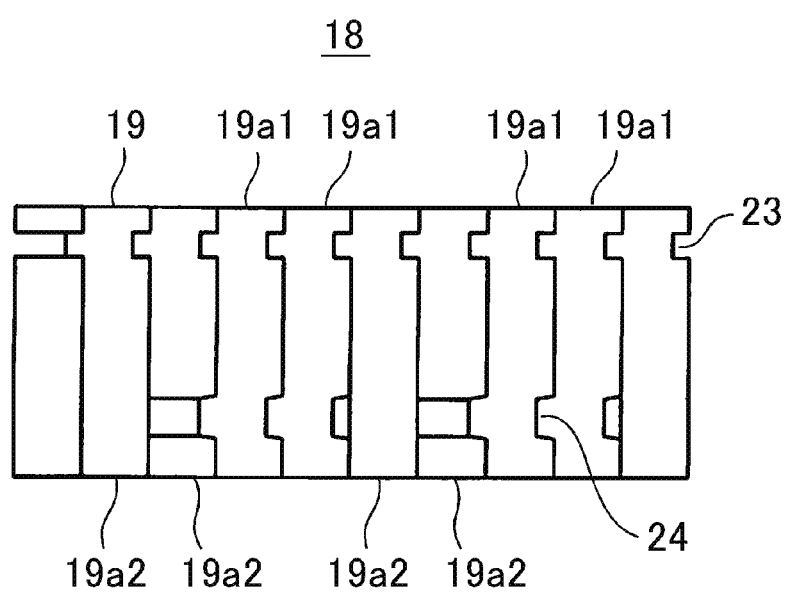
FIG. 14B is a cross-sectional view of the divided core in FIG. 14A, taken along the line X-X.
Figure 14C:
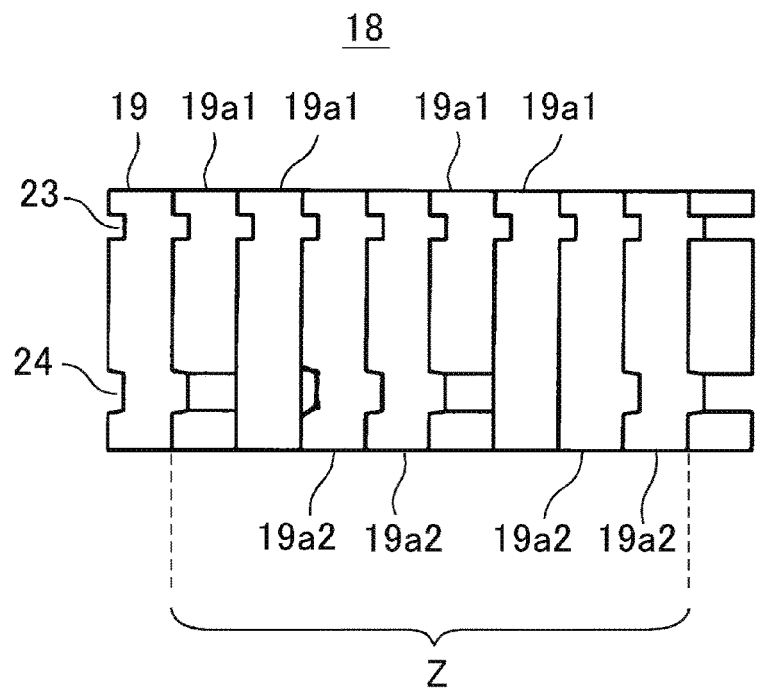
FIG. 14C is a cross-sectional view of the divided core in FIG. 14A, taken along the line Y-Y.

Each of FIGS. 14A, 14B, and 14C is a view illustrating a divided core of the stator in a rotating electric machine according to Embodiment 2. In Embodiment 2, with regard to the second swaging portion 24 to be provided in the tooth portion 21, the steel sheets 19 of the divided core 18, that are situated at the portion indicated by Reference Character Z (refer to FIG. 14C) in the lamination-thickness direction A include steel sheets 19a1 in each of which the second swaging portion 24 to be pressed into another steel sheet 19 through swaging is provided only in one of the two tooth portions and sheets 19a2 in each of which the second swaging portion 24 to be pressed into another steel sheet 19 through swaging is provided only in the other one of the two tooth portions, as illustrated in FIGS. 14A, 14B and 14C; a given number of the steel sheets 19a1 and a given number of the steel sheets 19a2 are alternately stacked. FIG. 14A is a view of the divided core 18, when viewed in the laminating direction; FIG. 14B is a cross-sectional view of the divided core in FIG. 14A, taken along the line X-X; FIG. 14C is a cross-sectional view of the divided core in FIG. 14A, taken along the line Y-Y.

Figure 15A:
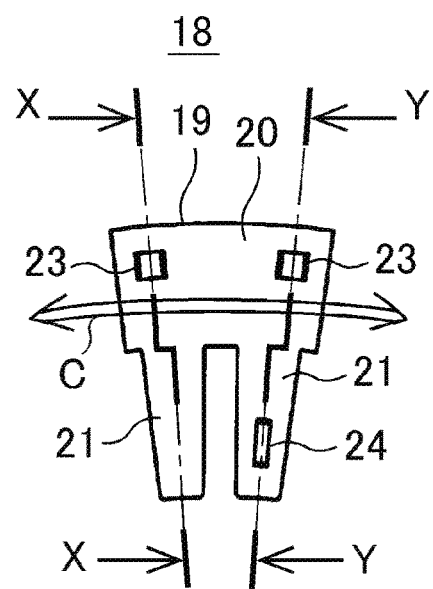
FIG. 15A is a view illustrating the image of magnetic flux along the yoke portion of the divided core in each of FIGS. 14A, 14B, and 14C.
Figure 15B:
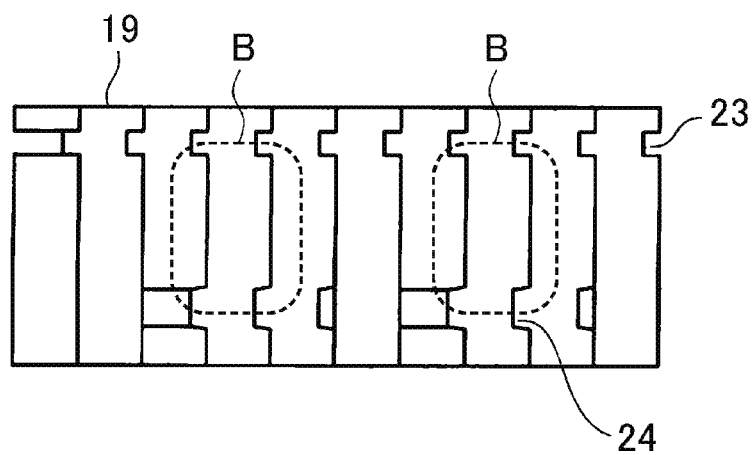
FIG. 15B is a view illustrating the image of an eddy current generated in the divided core in each of FIGS. 14A, 14B, and 14C.
Figure 15C:
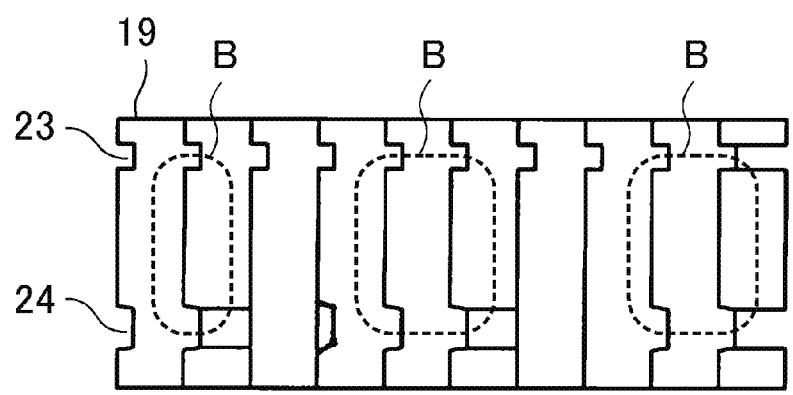
FIG. 15C is a view illustrating the image of an eddy current generated in the divided core in each of FIGS. 14A, 14B, and 14C.

As a result, for example, as illustrated in each of FIGS. 15B and 15C, the loop of the eddy-current conduction circuit B that is generated in the stator core 16 becomes small in comparison with the eddy-current conduction circuit B illustrated in each of FIGS. 13B and 13C, explained in Embodiment 1. Accordingly, the eddy current loss can be reduced. FIG. 15A is a view illustrating the image of magnetic flux lying along the yoke portion 20; each of FIGS. 15B and 15C is a view illustrating the image of an eddy current generated in the divided core 18 in each of FIGS. 14A, 14B, and 14C.

Because the portion where the steel sheets that are adjacent to each other in the thickness direction are united by the second swaging portion 24 and the portion where the steel sheets that are adjacent to each other in the thickness direction are not united by the second swaging portion 24 are alternately repeated, lamination can be performed without any difference between the thicknesses of two tooth portions 21 in the divided core 18. Because there exists no large difference between the thicknesses of the tooth portions 21, there is demonstrated an effect that the dimensional accuracy, in the lamination-thickness direction A, of the tooth portion 21 in the division cote 18 is raised.

Moreover, a given number of tooth portions 21 in the steel sheets 19 and a given number of tooth portions 21 in the steel sheets 19 are alternately united. Accordingly, it is made possible to maintain the magnetic balance among the phases of a three-phase motor, while securing the lamination strength of the divided core 18. Furthermore, because the magnetic balance, in the axle direction, of the stator core 16 is secured, there is demonstrated an effect that in the case where in order to reduce cogging torque, the rotor core 14 is laminated in such a way that stepped skew is formed, the effect of reducing the cogging torque is not liable to be reduced.

Because in each of Embodiments 1 and 2, two or more (two, in each of the drawings) first swaging portions 23 formed in the yoke portions are circumferentially provided through the intermediate line D between the two tooth portions 21 of the divided core 18 and are provided in all the steel sheets 19 to be stacked, the lamination strength of the yoke portion 20 can be secured. Accordingly, the yoke portion 20 can be prevented from warping.

In the case where the stator 12 is inserted into or shrinkage-fitted into the case 10 so as to be fixed to the case 10, compressive stress is caused in the yoke portion 20. Because in each of Embodiments 1 and 2, the lamination strength of the yoke portion 20 can be secured, buckling of the stator core 16 due to the compressive stress can be prevented and hence the deformation, in the axis direction, of the steel sheet 19 can be suppressed. As a result, in the case where another component is disposed in the axis-direction vicinity of the yoke portion 20, interference with such a component can be prevented.

Figure 16A:
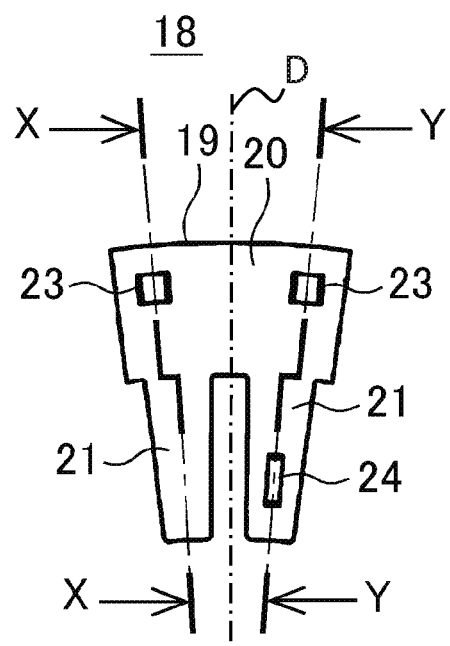
FIG. 16A is a view of another example of divided core in the stator of the rotating electric machine according to Embodiment 2 of the present invention, when viewed in the laminating direction.
Figure 16B:
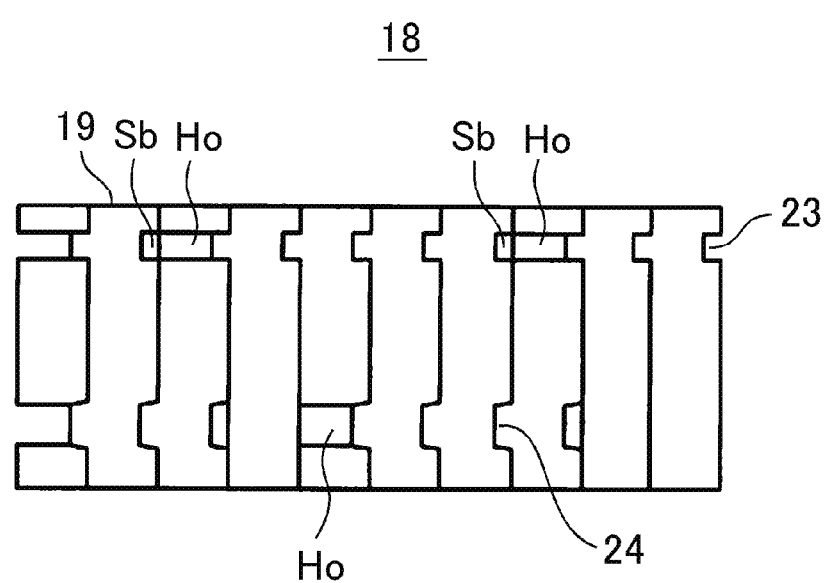
FIG. 16B is a cross-sectional view of the divided core in FIG. 16A, taken along the line X-X.
Figure 16C:
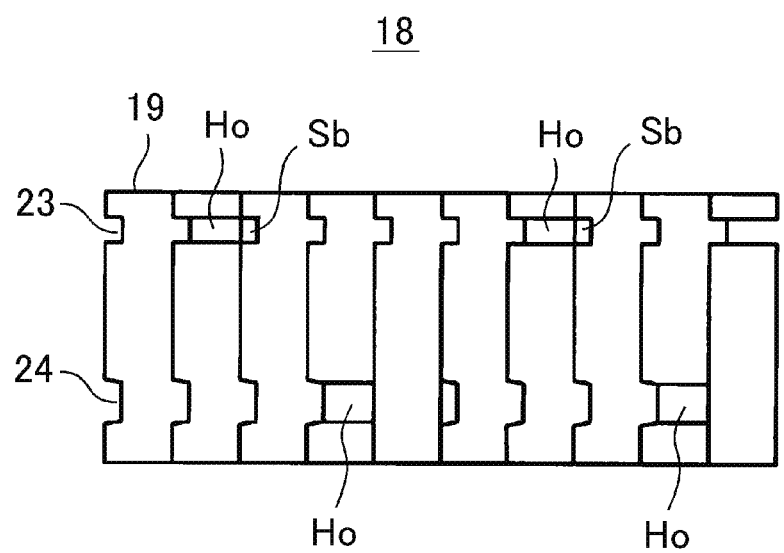
FIG. 16C is a cross-sectional view of the divided core in FIG. 16A, taken along the line Y-Y.

However, it is conceivable, as a matter of course, that in order to further reduce the loss in the rotating electric machine 100, caused by an eddy current, i.e., in order to further diminish the eddy-current conduction circuit B formed in the divided core 18, there is provided a portion Sb, as illustrated in each of FIGS. 16A, 16B, and 16C, where the steel sheets that are adjacent to each other in the thickness direction are not united with each other by the first swaging portion 23 in the yoke portion 20. FIG. 16A is a view of the divided core 18, when viewed in the laminating direction; FIG. 16B is a cross-sectional view of the divided core in FIG. 16A, taken along the line X-X; FIG. 16C is a cross-sectional view of the divided core in FIG. 16A, taken along the line Y-Y.

Figure 17:
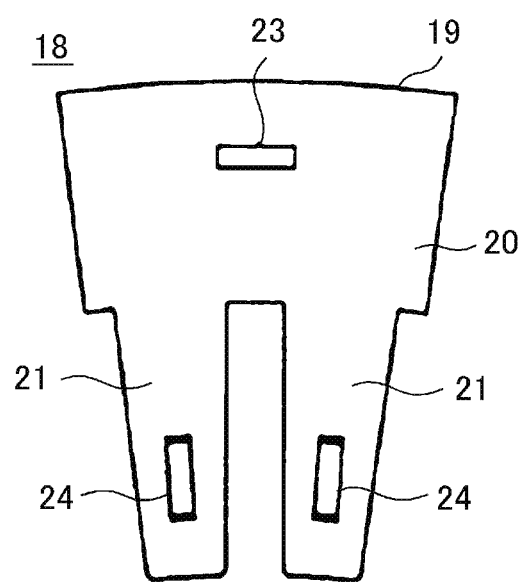
FIG. 17 is a front view of another example of steel sheet included in the divided core of the stator in the rotating electric machine according to Embodiment 2 of the present invention.

In each of Embodiments 1 and 2, there has been explained the case where as illustrated in FIGS. 11A, 11B, and 11C or in FIGS. 14A, 14B, and 14C, two first swaging portions 23 are provided in the yoke portion 20; however, even in the case where as illustrated in FIG. 17, a single first swaging portion 23 of the divided core 18 is provided in the yoke portion 20 and two second swaging portions 24 are provided in the two tooth portions 21, the effect described in each of Embodiments 1 and 2 can be demonstrated. FIG. 17 is a front view illustrating another example of steel sheet 19 included in the divided core 18.

Embodiment 3

Next, a rotating electric machine according to Embodiment 3 of the present invention will be explained.

Figure 18A:
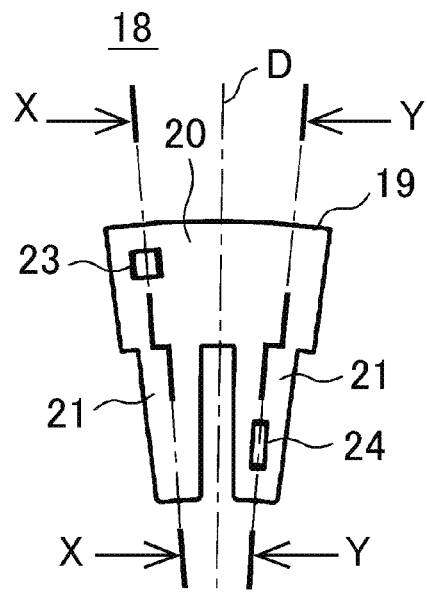
FIG. 18A is a view of a divided core in the stator of a rotating electric machine according to Embodiment 3 of the present invention, when viewed in the laminating direction.
Figure 18B:
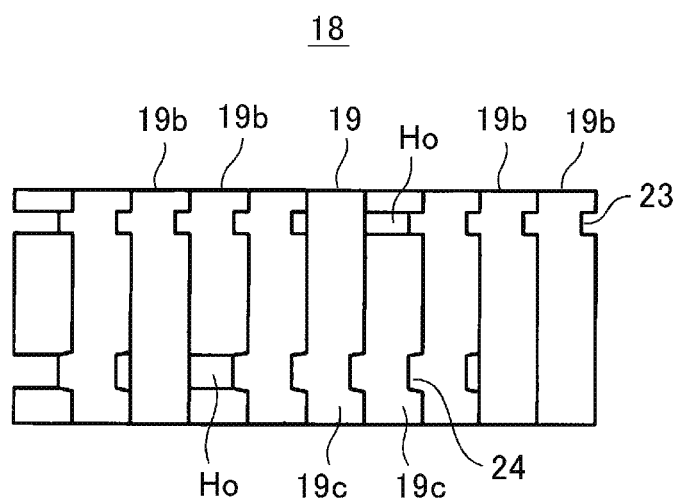
FIG. 18B is a cross-sectional view of the divided core in FIG. 18A, taken along the line X-X.
Figure 18C:
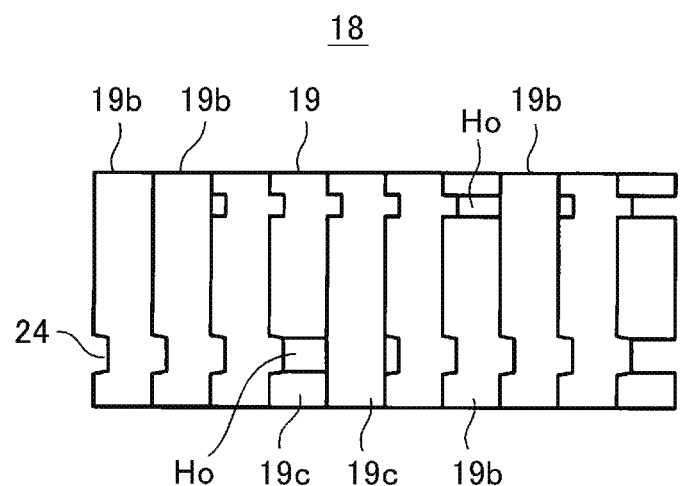
FIG. 18C is a cross-sectional view of the divided core in FIG. 18A, taken along the line Y-Y.
Figure 19A:
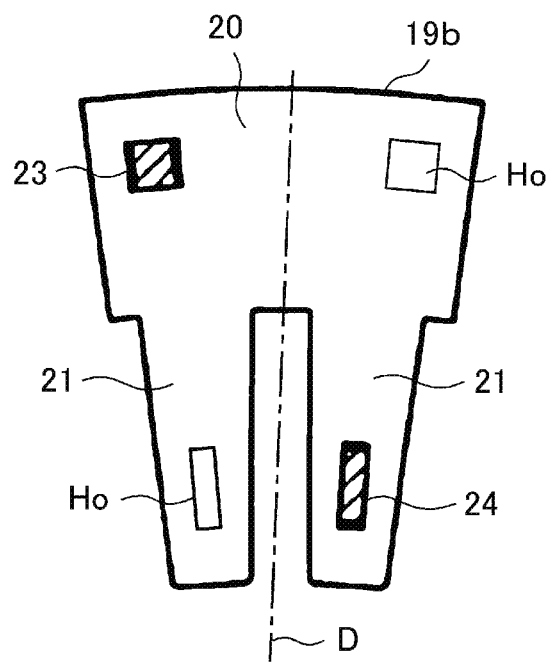
FIG. 19A is a front view of one of the steel sheets included in the divided core in the stator of the rotating electric machine according to Embodiment 3 of the present invention.
Figure 19B:
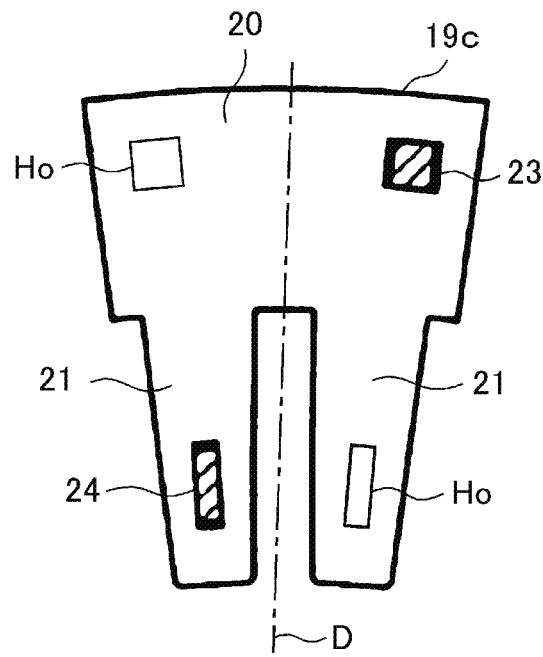
FIG. 19B is a front view of one of the steel sheets included in the divided core in the stator of the rotating electric machine according to Embodiment 3 of the present invention.

Each of FIGS. 18A, 18B, and 18C is a view illustrating a divided core of the stator in a rotating electric machine according to Embodiment 3. In Embodiment 3, as steel sheets 19b and 19c illustrated in FIGS. 19A and 19B, respectively, each of the second swaging portions 24 formed in two tooth portions 21, for uniting the steel sheets that are adjacent to each other in the thickness direction, is provided in only one of the two tooth portions 21. The first swaging portion 23 that is formed in the yoke portion 20 and unites the steel sheets that are adjacent to each other in the thickness direction is provided in steel sheets including a steel sheet in which the first swaging portion 23 is disposed only at the side circumferentially opposite to the second swaging portion 24 with respect to the intermediate line D between two tooth portions 21.

Swaged portions included in the divided core 18 illustrated in each of FIGS. 18A, 18B, and 18C have the second swaging portion 24 that is pressed into another steel sheet 19 through swaging at one tooth portion 21; the lamination is performed including the steel sheet 19b or 19c having a portion that is pressed into another steel sheet 19 through swaging by the first swaging portion 23 only at the side circumferentially opposite to the second swaging portion 24 with respect to the intermediate line D.

Figure 20A:
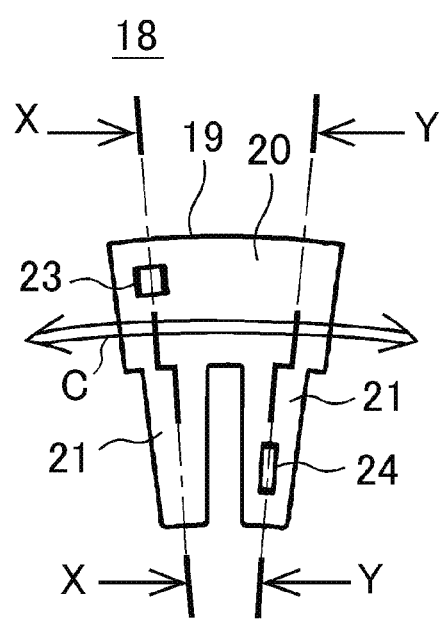
FIG. 20A is a view illustrating the image of magnetic flux along the yoke portion of the divided core in each of FIGS. 18A, 18B, and 18C.
Figure 20B:
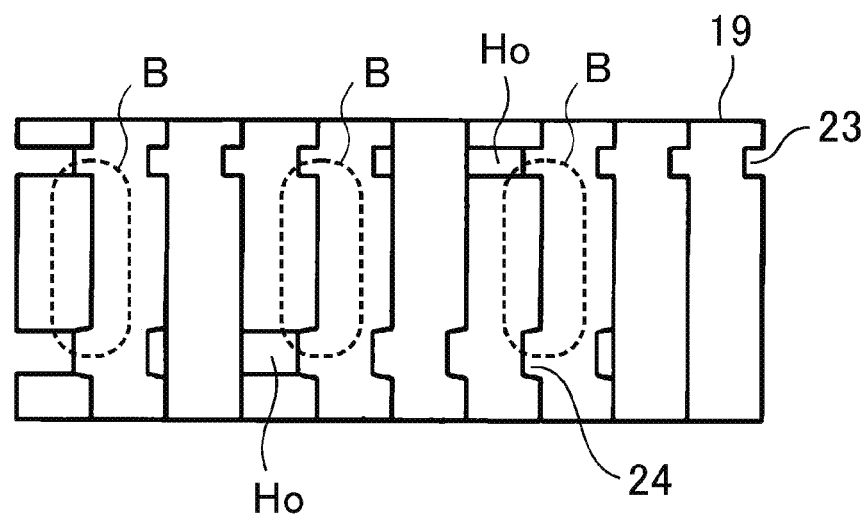
FIG. 20B is a view illustrating the image of an eddy current generated in the divided core in each of FIGS. 18A, 18B, and 18C.
Figure 20C:
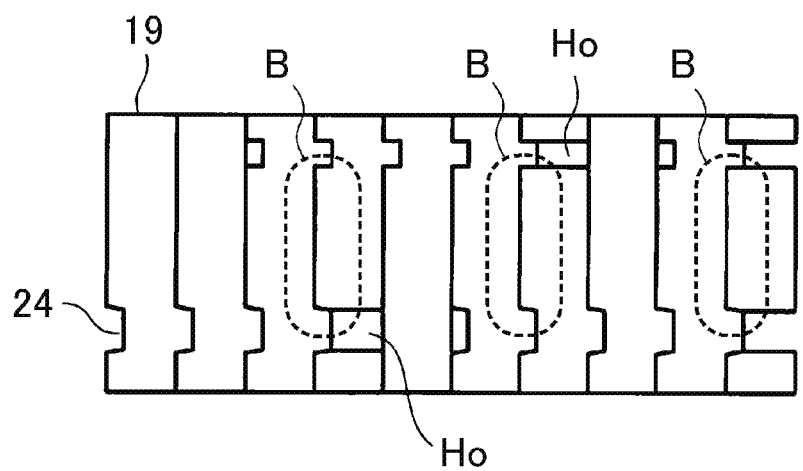
FIG. 20C is a view illustrating the image of an eddy current generated in the divided core in each of FIGS. 18A, 18B, and 18C.

As a result, for example, as illustrated in each of FIGS. 20B and 20C, the loop of the eddy-current conduction circuit B that is generated in the stator core 16 becomes small in comparison with the eddy-current conduction circuit B illustrated in each of FIGS. 9B and 9C, explained in Embodiment 1. Accordingly, the eddy current loss can be reduced. FIG. 20A is a view illustrating the image of magnetic flux lying along the yoke portion 20; each of FIGS. 20B and 20C is a view illustrating the image of an eddy current generated in the divided core 18 in each of FIGS. 18A, 18B, and 18C.

Moreover, because in each of the steel sheets 19b and 19c, the first swaging portion 23 and the second swaging portion 24 are provided in such a way as to flank the intermediate line D between two tooth portions 21, the thickness-direction lamination balance between the yoke portion 20 and the tooth portion 21 is secured; thus, the thickness-direction dimensional accuracy of the divided core 18 is raised.

Embodiment 4

Next, a rotating electric machine according to Embodiment 4 of the present invention will be explained.

Figure 21A:
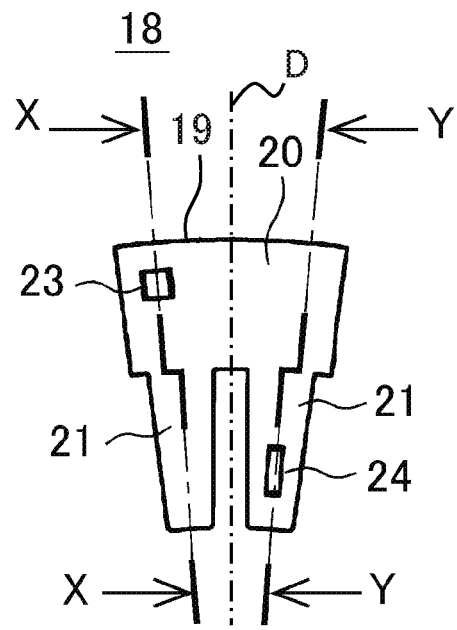
FIG. 21A is a view of a divided core in the stator of a rotating electric machine according to Embodiment 4 of the present invention, when viewed in the laminating direction.
Figure 21B:
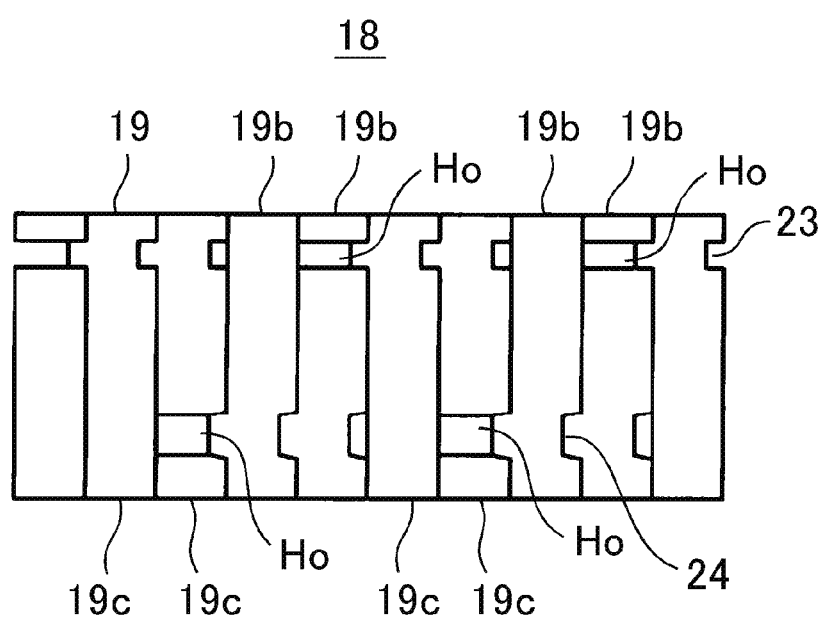
FIG. 21B is a cross-sectional view of the divided core in FIG. 21A, taken along the line X-X.
Figure 21C:
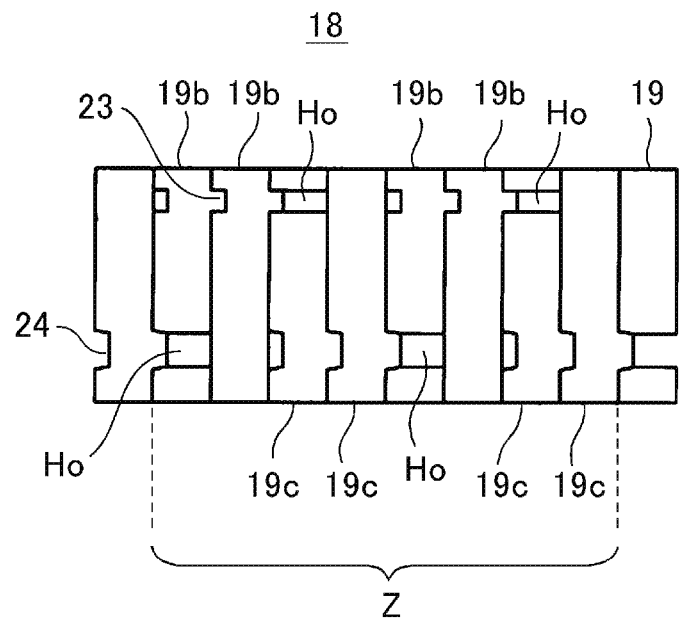
FIG. 21C is a cross-sectional view of the divided core in FIG. 21A, taken along the line Y-Y.

Each of FIGS. 21A, 21B, and 21C is a view illustrating a divided core of the stator in a rotating electric machine according to Embodiment 4. In Embodiment 4, with regard to the divided core 18, as illustrated in FIGS. 21A, 21B, 21C, the steel sheets 19 of the divided core 18, that are situated at the portion indicated by Reference Character Z (refer to FIG. 21C) in the lamination-thickness direction A include a first portion in which adjacent steel sheets are united by the second swaging portion 24 situated only in one of the two tooth portions 21 and these steel sheets are united by the first swaging portion 23 situated only at the side circumferentially opposite to the one of the two tooth portion 21 with respect to the intermediate line D and a second portion in which adjacent steel sheets are united by the second swaging portion 24 situated only in the other one of the two tooth portions 21 and these steel sheets are united by the first swaging portion 23 situated only at the side circumferentially opposite to the other one of the two tooth portion 21 with respect to the intermediate line D; a given number of the first portion and a given number of the second portion are alternately and recurrently stacked in the thickness direction. FIG. 21A is a view of the divided core 18, when viewed in the laminating direction; FIG. 21B is a cross-sectional view of the divided core in FIG. 21A, taken along the line X-X; FIG. 21C is a cross-sectional view of the divided core in FIG. 21A, taken along the line Y-Y.

As explained heretofore, for example, when magnetic flux C lying along the yoke portion 21 passes through the divided core 18, an eddy current that flows through the conduction circuit B formed by the first swaging portion 23 and the second swaging portion 24 only at one side with respect to the intermediate line D between the two tooth portions 21 is generated in the divided core 18; however, it is also conceivable that as illustrated in FIG. 10, there is generated an eddy current that passes through an eddy-current conduction circuit E formed by the first swaging portion 23 and the second swaging portion 24 that are situated in one of the two tooth portions 21 and in the other one thereof, respectively, with respect to the intermediate line D (unillustrated in FIG. 10).

Figure 22:
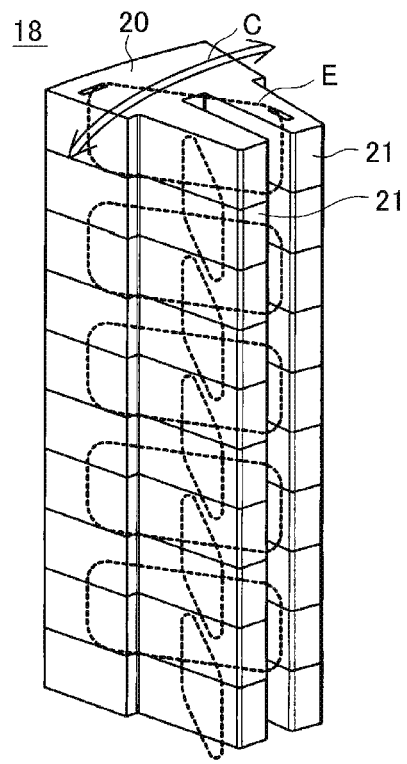
FIG. 22 is a view illustrating the images of magnetic flux and an eddy current generated in the divided core in each of FIGS. 21A, 21B, and 21C.

FIG. 22 is a view illustrating the image of an eddy current generated in the divided core in each of FIGS. 21A, 21B, and 21C. In Embodiment 4, in the portion of the divided core 18, in the lamination-thickness direction A, that is indicated by Reference Character Z, at least one of the first swaging portion 23 and the second swaging portion 24 is not pressed into the steel sheet, in one of the two tooth portion with respect to the intermediate line D between the tooth portions 21; the conduction circuit in which an eddy current flows is disconnected. Accordingly, in the foregoing portion, eddy current loss caused by the eddy-current conduction circuit to be formed by the first swaging portion 23 and the second swaging portion 24 at one side with respect to the intermediate line D between the two tooth portions 21 can largely be suppressed.

Because the eddy-current conduction circuit E, illustrated in FIG. 22, for an eddy current that passes through an eddy-current conduction circuit to be formed by the first swaging portion 23 and the second swaging portion 24 that are situated in one of the two tooth portions 21 and in the other one thereof, respectively, with respect to the intermediate line D becomes small in comparison with the conduction circuit E, illustrated in FIG. 10, formed through swaging according to a conventional technology, the eddy current loss can be suppressed.

With regard to the steel sheet 19, the steel sheet 19b in which the first swaging portion 23 and the second swaging portion 24 are provided in such a way as to flank the intermediate line D between two tooth portions 21 and the steel sheet 19c in which the first swaging portion 23 and the second swaging portion 24 are provided in such a way as to flank the intermediate line D between two tooth portions 21 and in such a way that the arrangement relationship therebetween is reverse to that in the steel sheet 19b are alternately stacked, so that the balance between the yoke portion 20 and the tooth portion 21 in the lamination-thickness direction A can be secured; thus, the dimensional accuracy, in the thickness direction, of the divided core 18 is raised. Moreover, unevenness, in the lamination-thickness direction A, of the circumferential direction of the yoke portion 20 can be suppressed; thus, unevenness, in the lamination-thickness direction A, of the two tooth portions 21 can also be suppressed.

Figure 23A:
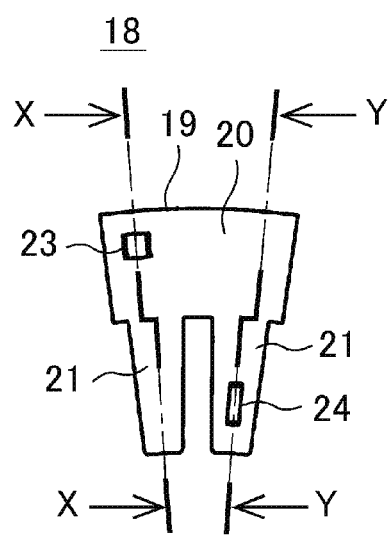
FIG. 23A is a view of another example of divided core in the stator of the rotating electric machine according to Embodiment 4 of the present invention, when viewed in the laminating direction.
Figure 23B:
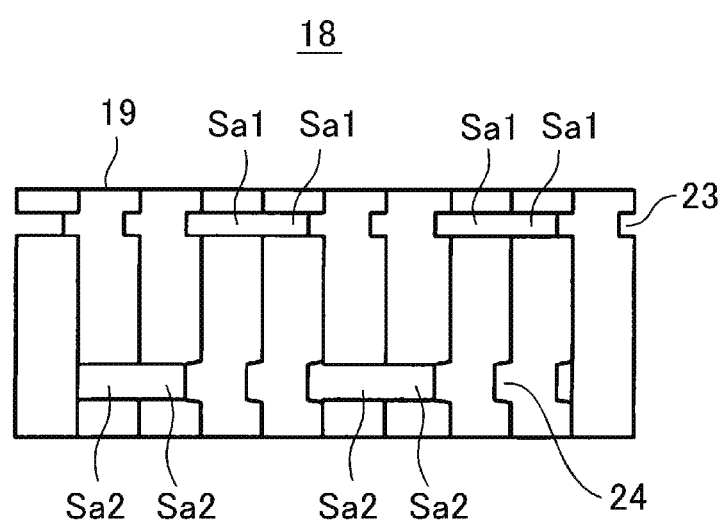
FIG. 23B is a cross-sectional view of the divided core in FIG. 23A, taken along the line X-X.
Figure 23C:
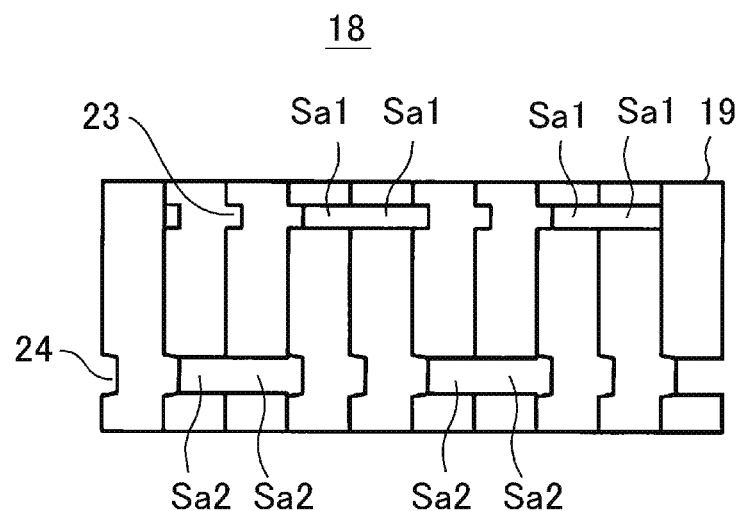
FIG. 23C is a cross-sectional view of the divided core in FIG. 23A, taken along the line Y-Y.

Each of FIGS. 23A, 23B, and 23C is a view illustrating a variation example of divided core of the stator in the rotating electric machine according to Embodiment 4.

In each of Embodiments 1, 2, and 3 and Embodiment 4 explained with reference to FIGS. 21A, 21B, and 21C, the portion, of the divided core, that is not pressed into another steel sheet 19 by the first swaging portion 23 or the second swaging portion 24 has a plane, in the part where the swaging portion is to be formed, that is similar to the periphery thereof or has a through-hole Ho into which the swaging portion of another steel sheet 19 is pressed. However, it is also conceivable, as a matter of course, that as illustrated in each of FIGS. 23A, 23B, and 23C, a through-hole is provided in each of portions Sa1 and Sa2, into each of which the swaging portion of another steel sheet 19 is not pressed by the first swaging portion 23 or the second swaging portion 24. FIG. 23A is a view of the divided core 18, when viewed in the laminating direction; FIG. 23B is a cross-sectional view of the divided core in FIG. 23A, taken along the line X-X; FIG. 23C is a cross-sectional view of the divided core in FIG. 23A, taken along the line Y-Y.

Embodiment 5

Next, a rotating electric machine according to Embodiment 5 of the present invention will be explained.

Figure 24A:
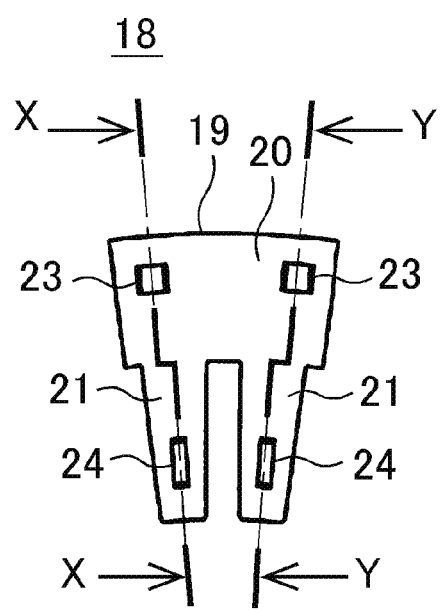
FIG. 24A is a view of a divided core in the stator of a rotating electric machine according to Embodiment 5 of the present invention, when viewed in the laminating direction.
Figure 24B:
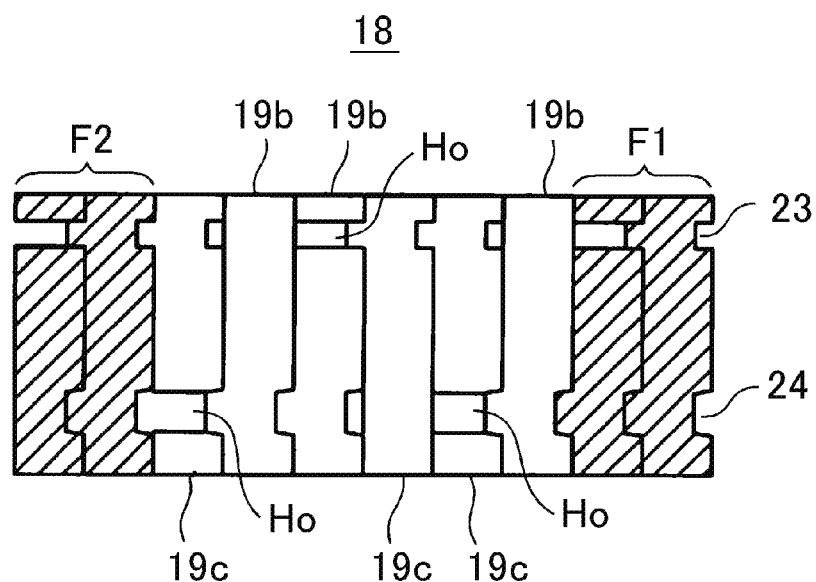
FIG. 24B is a cross-sectional view of the divided core in FIG. 24A, taken along the line X-X.
Figure 24C:
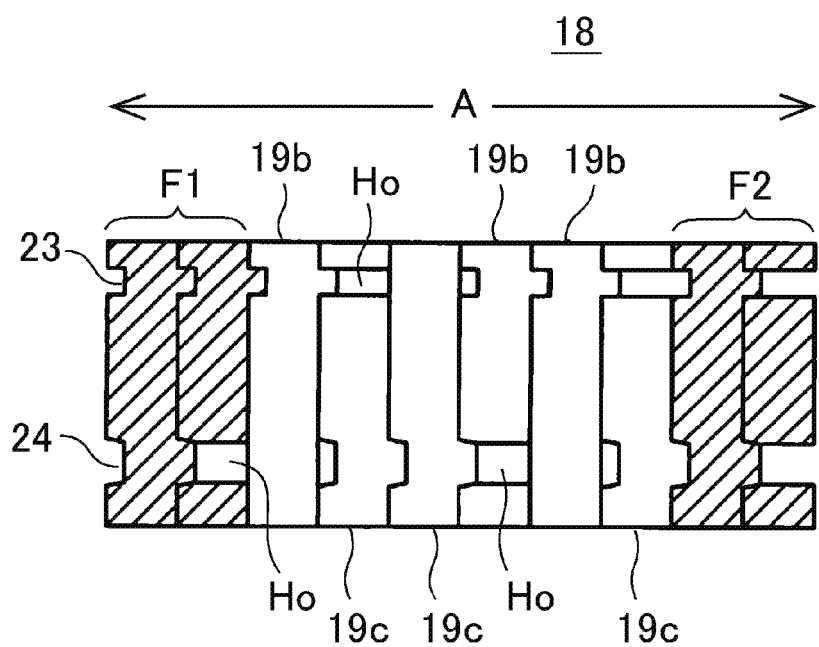
FIG. 24C is a cross-sectional view of the divided core in FIG. 24A, taken along the line Y-Y.

Each of FIGS. 24A, 24B, and 24C is a view illustrating a divided core of the stator in a rotating electric machine according to Embodiment 5. As illustrated in each of FIGS. 24A, 24B, and 24C, in two or more steel sheets 19 of each of end portions F1 and F2 at the both thickness-direction ends of the divided core 18, all steel sheets 19 that are adjacent to one another in the thickness direction are united by two first swaging portions 23 circumferentially provided in the yoke portion 20 of the divided core 18 and respective second swaging portions 24 provided in two tooth portions 21 that each extend from the yoke portion 20 toward the radial-direction inner side. FIG. 24A is a view of the divided core 18, when viewed in the laminating direction; FIG. 24B is a cross-sectional view of the divided core in FIG. 24A, taken along the line X-X; FIG. 24C is a cross-sectional view of the divided core in FIG. 24A, taken along the line Y-Y.

In Embodiment 5, in two or more stacked steel sheets 19 of each of the end portions F1 and F2 at the both ends, all steel sheets 19 that are adjacent to one another in the thickness direction are united by two first swaging portions 23 and respective second swaging portions 24 provided in two tooth portions 21; therefore, a warp in the tooth portion 21 can further be prevented.

Moreover, concentration of the swaging portions at the portion, in the divided core 18, where the low magnetic flux density is low makes it possible to reduce the loss caused by forming the swaging portions and to maintain the strength of the lamination.

Embodiment 6

Next, a rotating electric machine according to Embodiment 6 of the present invention will be explained.

Figure 25:
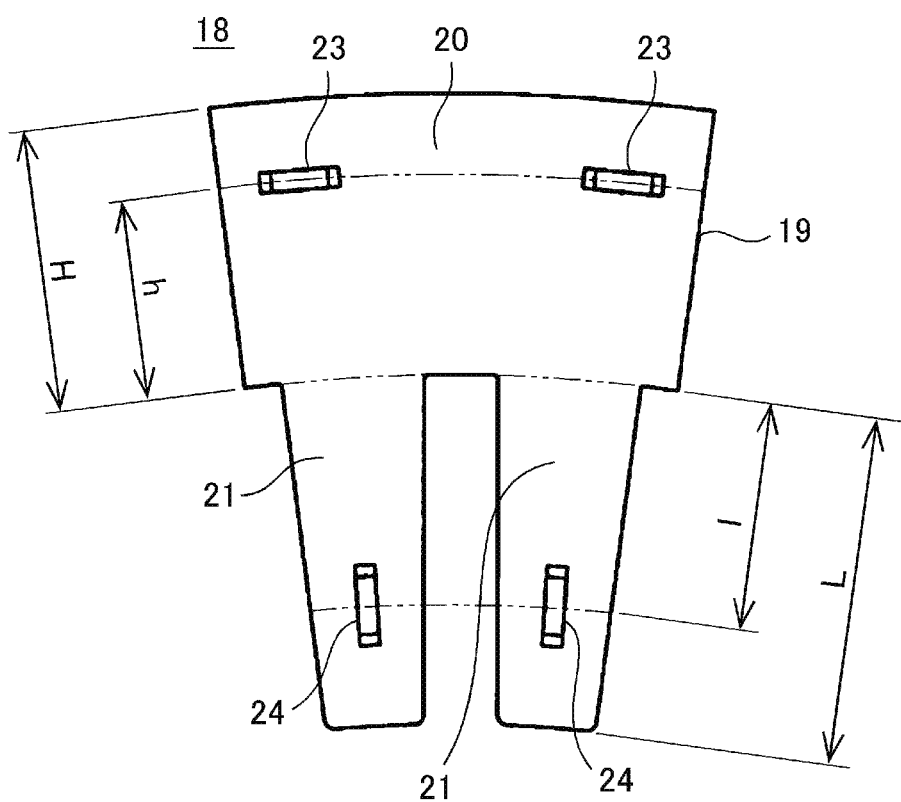
FIG. 25 is a front view of one of the steel sheets included in the divided core in the stator of a rotating electric machine according to Embodiment 6 of the present invention.

FIG. 25 is a front view of one of the steel sheets included in the divided core in the stator of a rotating electric machine according to Embodiment 6. The center position of at least one of the first swaging portions 23 formed in the yoke portion 20 of the steel sheet 19 included in the divided core 18 is situated closer to the outer circumference of the steel sheet 19 than the center position of the radial-direction width H of the yoke portion 20. In other words, in FIG. 25, the first swaging portion 23 is provided in such a way that the relationship "h≥½H" is established. As a result, a warp in the yoke portion 20 can strongly be prevented; thus, the effect of Embodiment 2 can be enhanced. The center position of at least one of the respective second swaging portions 24 formed in the tooth portions 21 is situated closer to the inner circumference than the center position of the radial-direction length L of the tooth portion 21. In other words, in FIG. 25, the second swaging portion 24 is provided in such a way that the relationship "1≥½L" is established. As a result, a warp in the tooth portion 21 can strongly be prevented; thus, the effect of Embodiment 2 can be enhanced.

In a conventional method, there has been a problem that when as described above, the swaging portion in the yoke portion 20 is provided at a position close to the outer circumference or the swaging portion in the tooth portion 21 is provided at a position close to the inner circumference, the eddy-current conduction circuit formed through the swaging portions becomes large and hence the loss caused by an eddy current increases.

However, in Embodiment 6, the loop of an eddy-current conduction circuit formed due to swaging can be diminished in the lamination-thickness direction A of the divided core 18. Accordingly, even when the radial-direction conduction path becomes larger than the conduction path in the lamination-thickness direction A, the size of the eddy-current conduction circuit formed in the divided core 18 can be suppressed to a rather small one; thus, the strength of the lamination can be raised while the loss is reduced.

Embodiments 1 through 6 of the present invention have been explained heretofore; however, in the scope of the present invention, the embodiments thereof can freely be combined with one another and can appropriately be modified or omitted. For example, as a matter of course, a configuration other than those in the embodiments explained hereto is conceivable in which in order to diminish the eddy-current conduction circuit formed in the divided core 18 while maintaining the lamination strength, the positional relationship between the first swaging portion 23 and the second swaging portion 24 in the plane direction of the steel sheet 19 and the respective numbers of the first swaging portions 23 and the second swaging portions 24 are changed or in which in order to disconnect the eddy-current conduction circuit, for example, the thickness-direction position of the portion that is not pressed into another steel sheet 19 is changed.

The invention claimed is:
1. A rotating electric machine comprising:
a rotor pivotably provided; and
a stator disposed at an outer circumference side of the rotor,
wherein the stator includes an annular stator core and a coil portion wound around the stator core,
wherein the stator core includes two or more divided cores arranged in an annular manner,
wherein each of the two or more divided cores has a laminated structure including steel sheets,
wherein each of the steel sheets includes:
  a yoke portion arranged in a circumferential direction;
  two tooth portions arranged to protrude from the yoke portion toward a radial-direction inner side;
  at least one first swaging portion provided in the yoke portion; and
  at least one second swaging portion respectively provided in at least one of the two tooth portions,
wherein each of the two or more divided cores includes a first portion in which a first adjacent pair of the steel sheets are united by two of the at least one second swaging portion respectively provided in the two tooth portions of each of the first adjacent pair of the steel sheets, wherein each of the two or more divided cores includes a second portion in which a second adjacent pair of the steel sheets are not united by the at least one second swaging portion provided in one of the two tooth portions of one of the second adjacent pair of the steel sheets, at another one of the two tooth portions of the one of the second adjacent pair of the steel sheets, and wherein the second adjacent pair of the steel sheets are united by the at least one second swaging portion provided in the one of the two tooth portions of the one of the second adjacent pair of the steel sheets, at the one of the two tooth portions of the one of the second adjacent pair of the steel sheets.

2. The electric rotating machine according to claim 1, wherein each of the two more divided cores has:
- a first number of first portions in each of which a third adjacent pair of the steel sheets are united by the at least one second swaging portion provided in only one of the two tooth portions of one of the third adjacent pair of the steel sheets; and
- a second number of second portions in each of which a fourth adjacent pair of the steel sheets are united by the at least one second swaging portion provided in one of the two tooth portions of one of the fourth adjacent pair of the steel sheets, the one of the two tooth portions of the one of the fourth adjacent pair of the steel sheets being opposite to the one of the two tooth portions of the one of the third adjacent pair of the steel sheets, and wherein the first portions and the second portions are alternately stacked.

3. The electric rotating machine according to claim 1, wherein all of the steel sheets are united respectively by the at least one first swaging portion included in each of the steel sheets.

4. The electric rotating machine according to claim 1, wherein the at least one second swaging portion respectively is provided in the two tooth portions, and
wherein the at least one first swaging portion is provided at two positions that circumferentially flank an intermediate line between the two tooth portions.

5. The electric rotating machine according to claim 1, wherein the first portion is at both ends of each of the two or more divided cores, and
wherein the first adjacent pair of the steel sheets are further united by the at least one first swaging portion provided in the yoke portion of each of the first adjacent pair of the steel sheets.

6. The electric rotating machine according to claim 1, wherein the at least one first swaging portion is provided closer to an outer circumference of each of the steel sheets than a center position of a radial-direction width of the yoke portion.

7. The electric rotating machine according to claim 1, wherein the at least one second swaging portion is provided closer to an inner circumference of each of the steel sheets than a center position of a radial-direction length of each of the two tooth portions.

* * * * *